(12) United States Patent
Amano

(10) Patent No.: US 8,820,946 B2
(45) Date of Patent: Sep. 2, 2014

(54) PROJECTION OPTICAL SYSTEM AND PROJECTION DISPLAY APPARATUS

(71) Applicant: Fujifilm Corporation, Tokyo (JP)

(72) Inventor: Masaru Amano, Saitama-ken (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 14/035,986

(22) Filed: Sep. 25, 2013

(65) Prior Publication Data

US 2014/0022518 A1 Jan. 23, 2014

Related U.S. Application Data

(63) Continuation of application No. PCT/JP2012/001867, filed on Mar. 16, 2012.

(30) Foreign Application Priority Data

Mar. 28, 2011 (JP) .................................. 2011-069285

(51) Int. Cl.
| | | |
|---|---|---|
| G03B 21/14 | (2006.01) | |
| G02B 17/08 | (2006.01) | |
| G02B 27/00 | (2006.01) | |
| G03B 21/28 | (2006.01) | |
| G02B 13/16 | (2006.01) | |
| G03B 33/12 | (2006.01) | |

(52) U.S. Cl.
CPC .......... *G03B 21/142* (2013.01); *G02B 17/0852* (2013.01); *G02B 13/16* (2013.01); *G03B 33/12* (2013.01); *G02B 27/0025* (2013.01); *G03B 21/28* (2013.01)
USPC ................. 353/101; 353/38; 353/37; 353/94; 353/98; 353/102; 359/651; 359/689

(58) Field of Classification Search
USPC ............. 353/30, 37, 38, 94, 98–99, 101, 102; 359/689, 651, 726, 733, 785; 348/742–747, 756, E5.137, E9.026; 349/5, 7–9
See application file for complete search history.

(56) References Cited

U.S. PATENT DOCUMENTS 6,752,500 B1 * 6/2004 Yoshii et al. .................... 353/78
7,791,819 B2 * 9/2010 Eguchi ......................... 359/689

(Continued)

FOREIGN PATENT DOCUMENTS

| JP | 9-258102 | 10/1997 |
| JP | 2003-015033 | 1/2003 |

(Continued)

OTHER PUBLICATIONS

International Search Report, PCT/JP2012/001867, Jul. 17, 2012.

*Primary Examiner* — Sultan Chowdhury
(74) *Attorney, Agent, or Firm* — Young & Thompson

(57) ABSTRACT

A projection optical system substantially consists of a first optical system composed of a plurality of lens groups and a second optical system composed of one reflection mirror having a convex aspherical surface arranged in this order from the reduction side, in which all optical surfaces constituting the first and second optical systems are formed so as to have rotationally symmetrical shapes around one common axis, the projection optical system is configured such that focus adjustment is performed by individually moving two lens groups in the first optical system along the common axis, and the lens disposed on the most magnification side in the reduction side lens group of the two lens groups is a lens having a convex surface on the magnification side, thereby magnifying and projecting an image formed on a conjugate plane on the reduction side to a conjugate plane on the magnification side.

16 Claims, 21 Drawing Sheets

(56) References Cited

U.S. PATENT DOCUMENTS

| | | | |
|---|---|---|---|
| 7,957,078 B2* | 6/2011 | Minefuji | 359/731 |
| 8,226,248 B2* | 7/2012 | Amano | 353/119 |
| 2001/0050758 A1* | 12/2001 | Suzuki et al. | 353/69 |
| 2002/0030791 A1* | 3/2002 | Ogawa | 353/30 |
| 2003/0137744 A1 | 7/2003 | Kuwa et al. | |
| 2005/0041220 A1* | 2/2005 | Sunaga | 353/99 |
| 2006/0050408 A1* | 3/2006 | Hakko et al. | 359/692 |
| 2007/0253076 A1 | 11/2007 | Takaura et al. | |
| 2009/0141370 A1 | 6/2009 | Takaura et al. | |
| 2010/0128234 A1 | 5/2010 | Nishikawa | |
| 2010/0277703 A1 | 11/2010 | Hisada et al. | |
| 2011/0026111 A1 | 2/2011 | Nagatoshi | |
| 2011/0299039 A1 | 12/2011 | Yatsu | |
| 2011/0299049 A1 | 12/2011 | Yatsu et al. | |

FOREIGN PATENT DOCUMENTS

| | | |
|---|---|---|
| JP | 2007-323047 | 12/2007 |
| JP | 2009-058754 | 3/2009 |
| JP | 2010-072374 | 4/2010 |
| JP | 2010-122573 | 6/2010 |
| JP | 2010-204328 | 9/2010 |
| JP | 2011-033737 | 2/2011 |
| JP | 2011-253023 | 12/2011 |
| JP | 2011-253024 | 12/2011 |

* cited by examiner

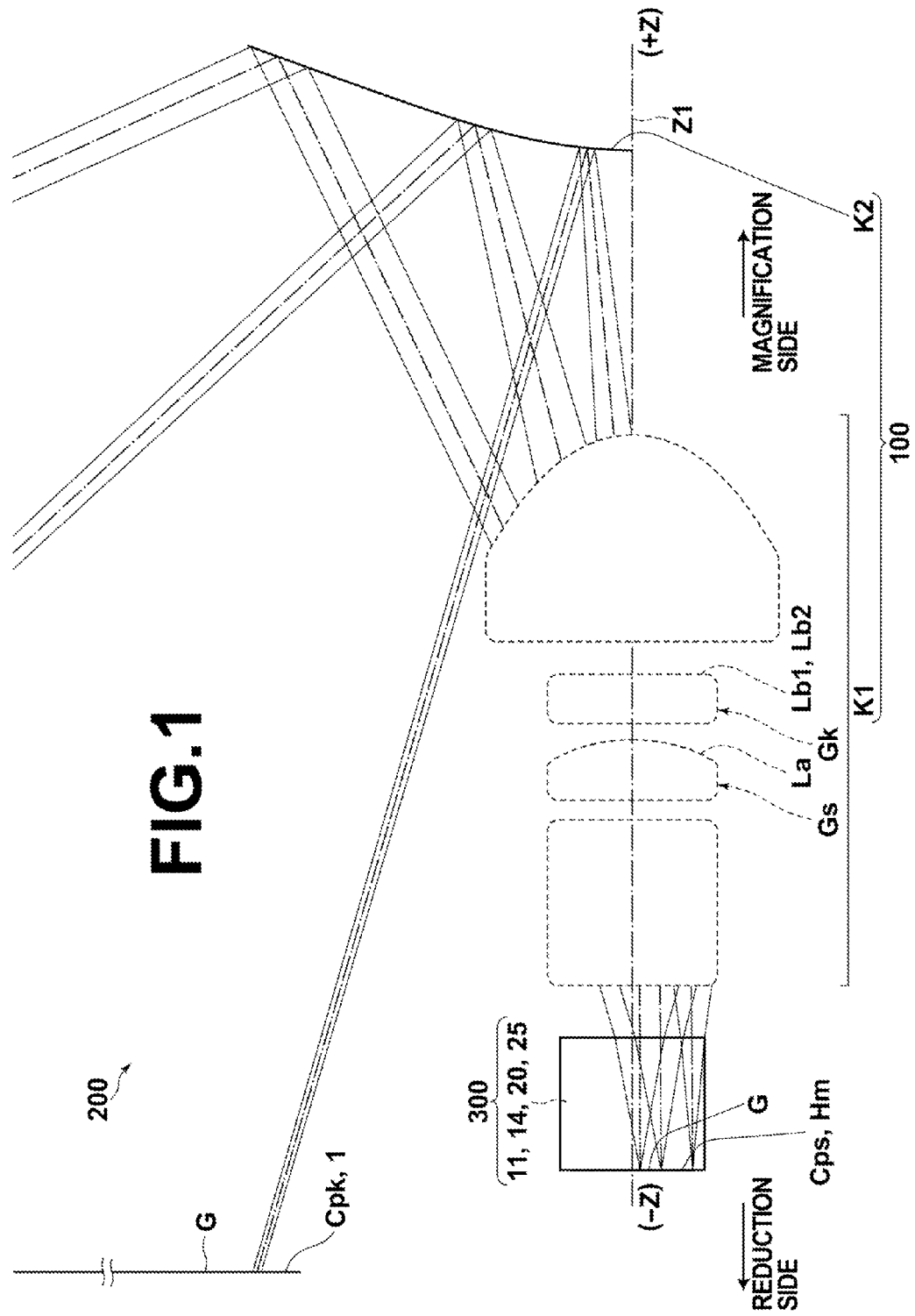

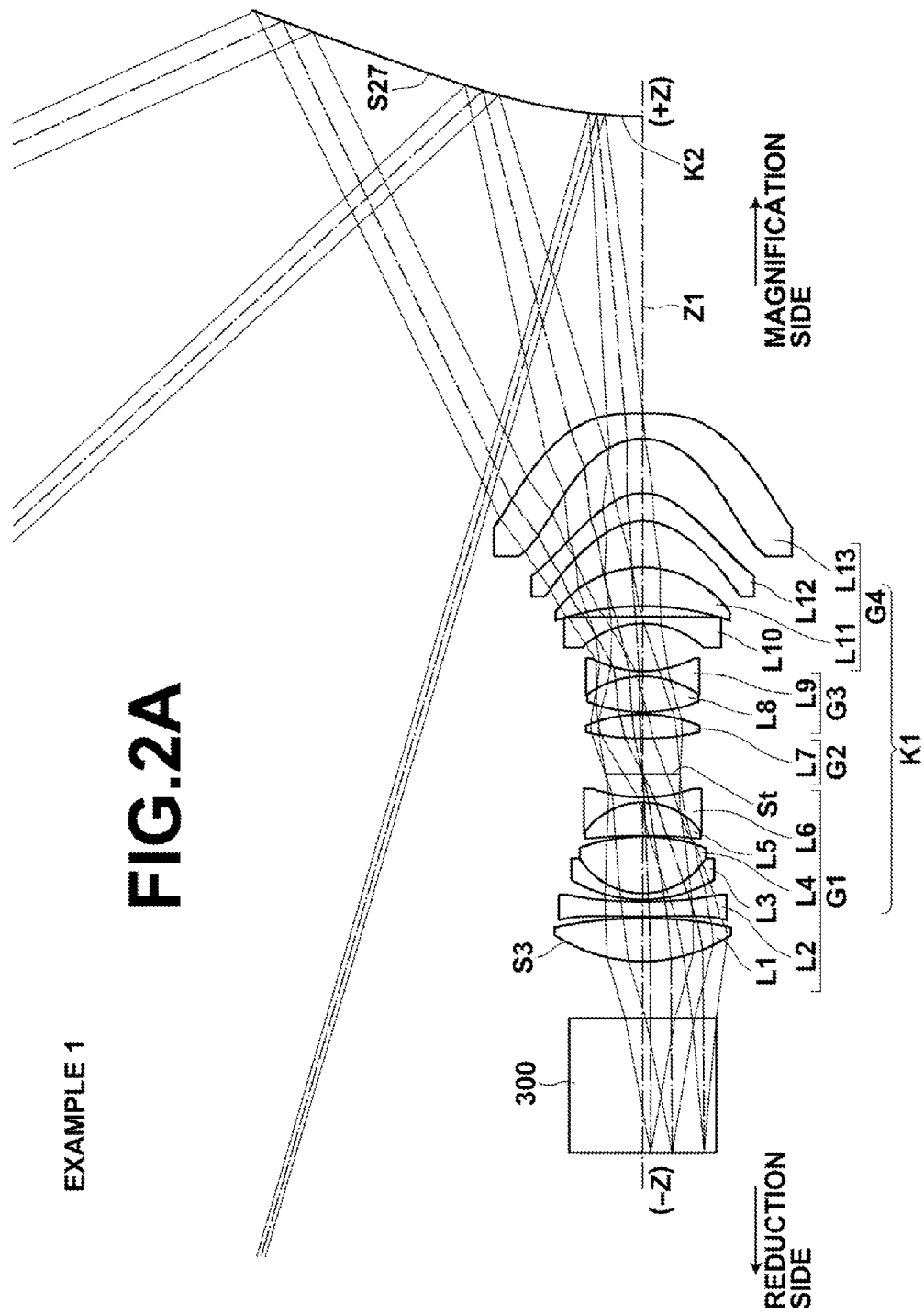

FIG.2B
EXAMPLE 1    DISTORTION
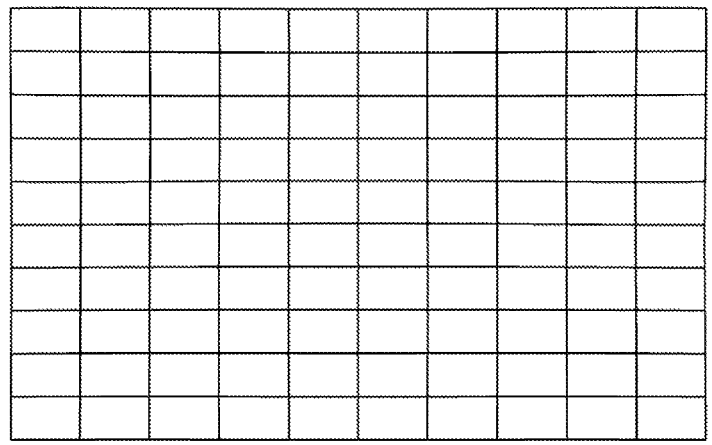
FIG.2C
EXAMPLE 1    SPOT DIAGRAMS (SIZE: 5 mm/SQUARE)
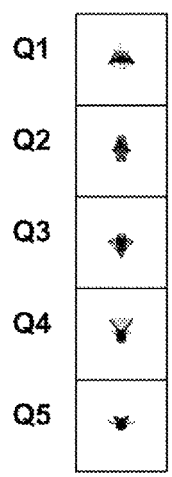
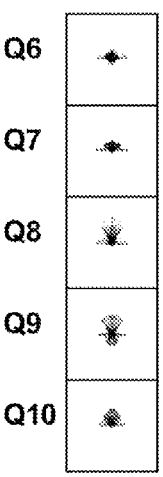
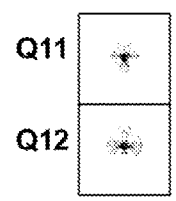

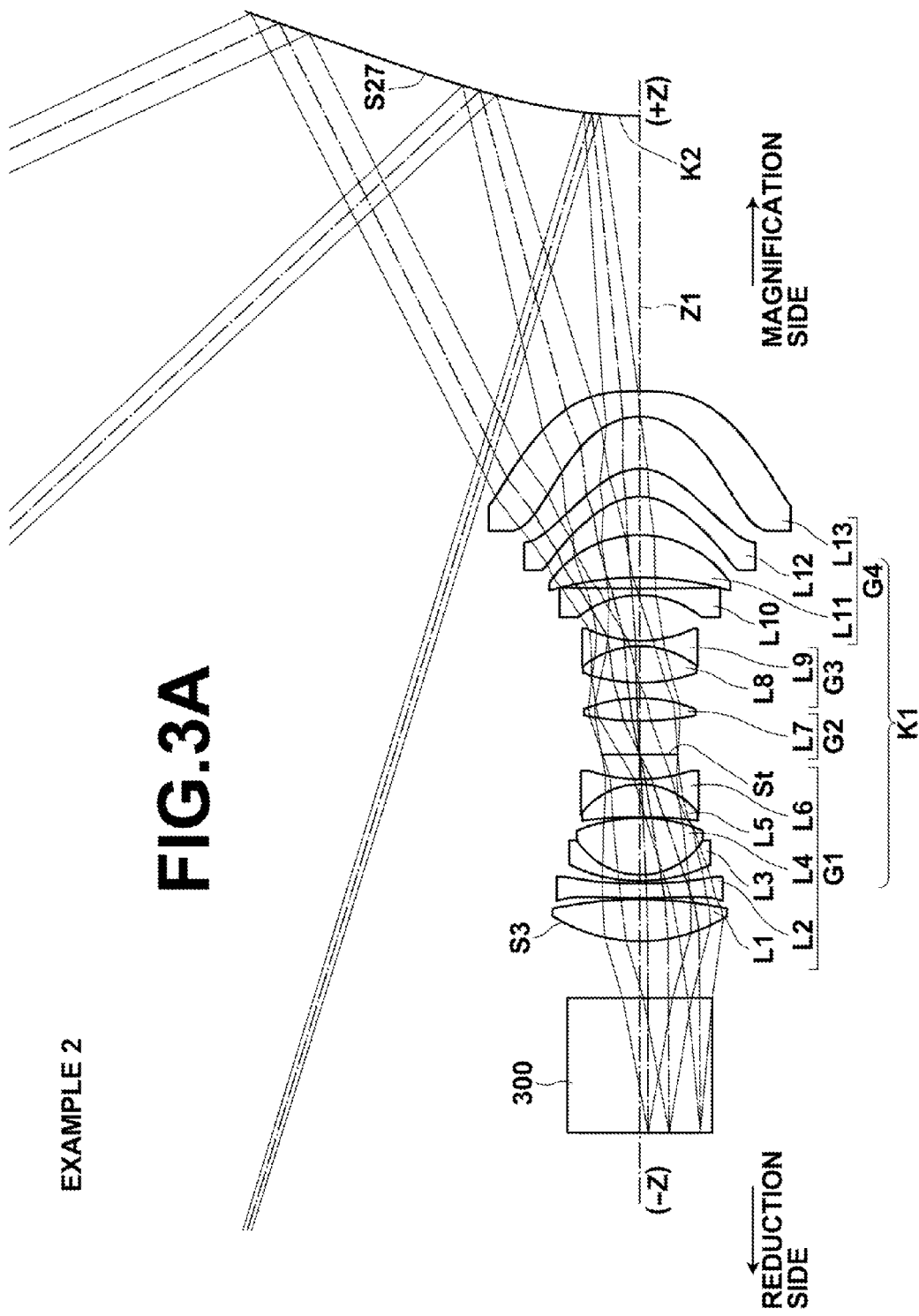

FIG.3B
EXAMPLE 2    DISTORTION
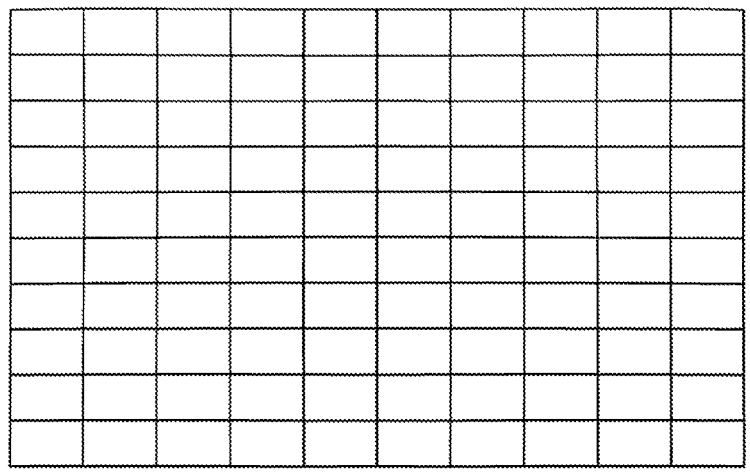
FIG.3C
EXAMPLE 2    SPOT DIAGRAMS (SIZE: 5 mm/SQUARE)
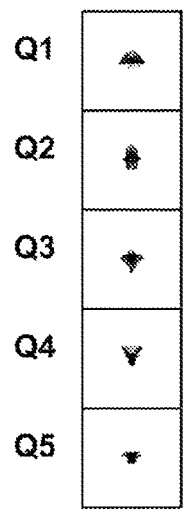 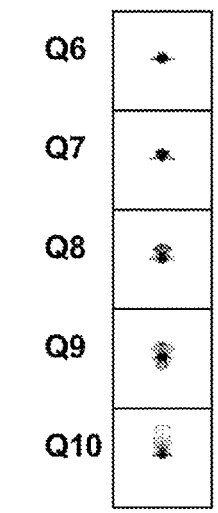 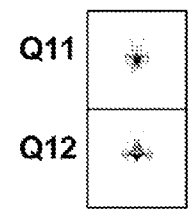

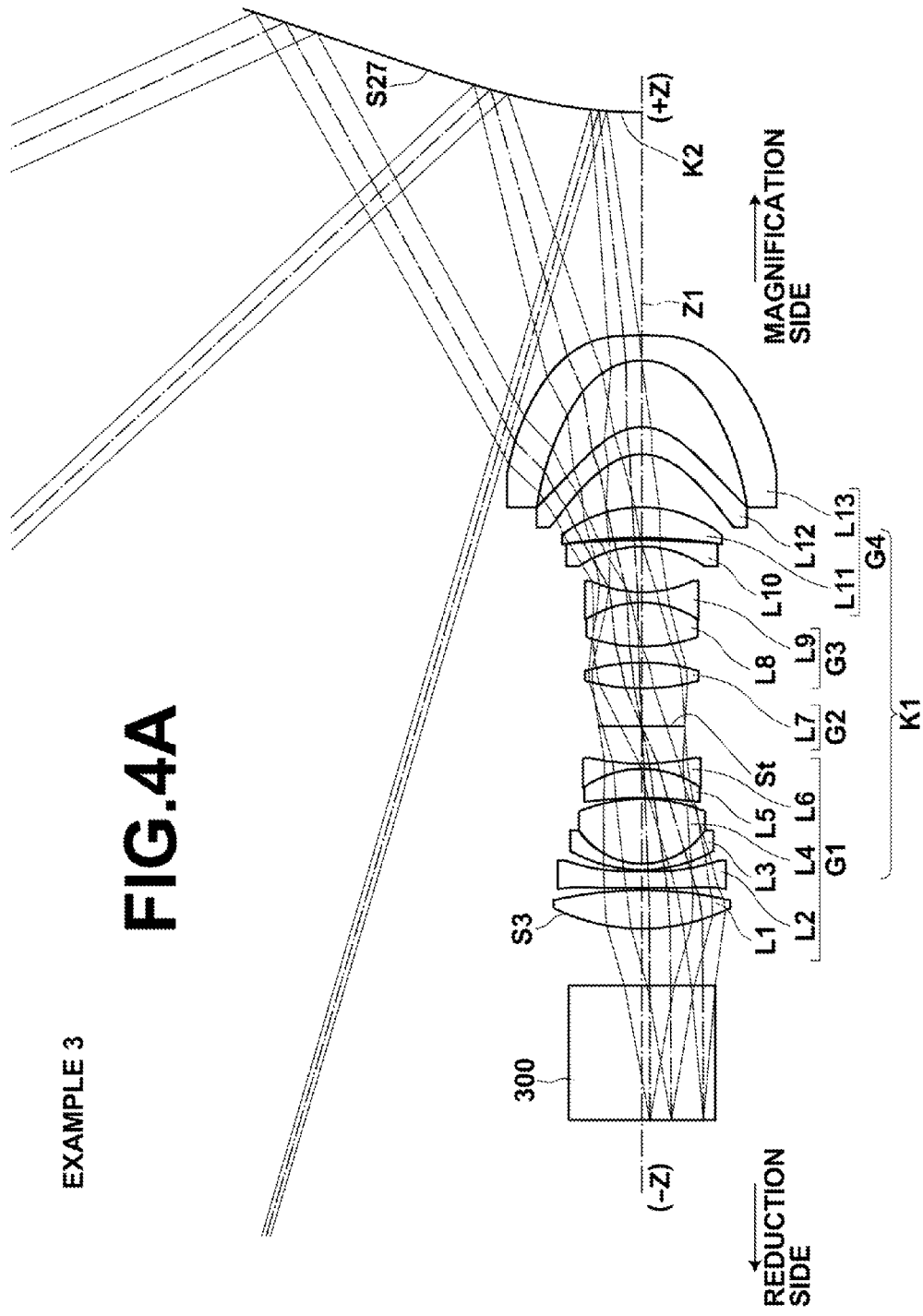

EXAMPLE 3    DISTORTION

EXAMPLE 3    SPOT DIAGRAMS (SIZE: 5 mm/SQUARE)

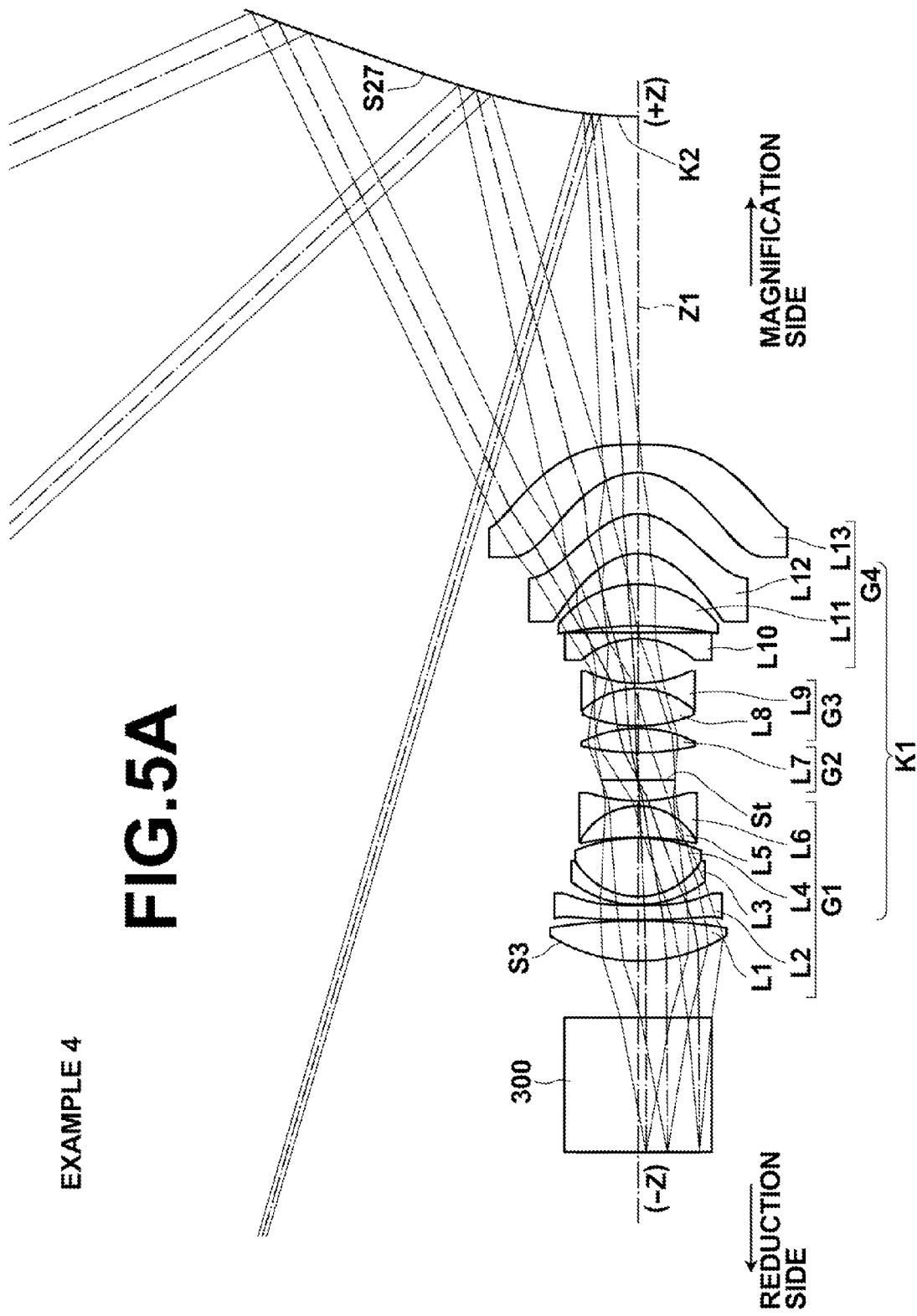

FIG.5B
EXAMPLE 4    DISTORTION
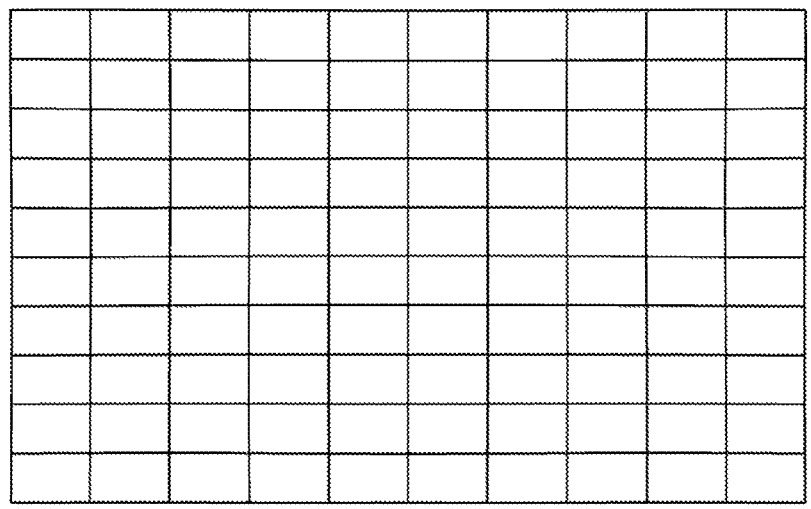
FIG.5C
EXAMPLE 4    SPOT DIAGRAMS (SIZE: 5 mm/SQUARE)
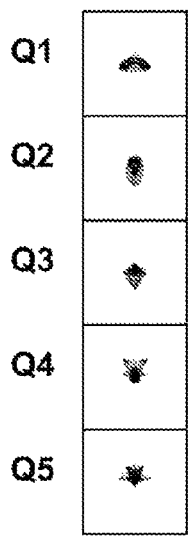 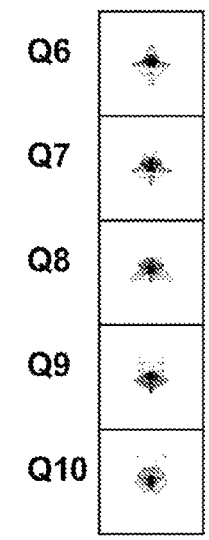 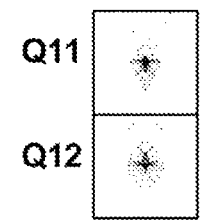

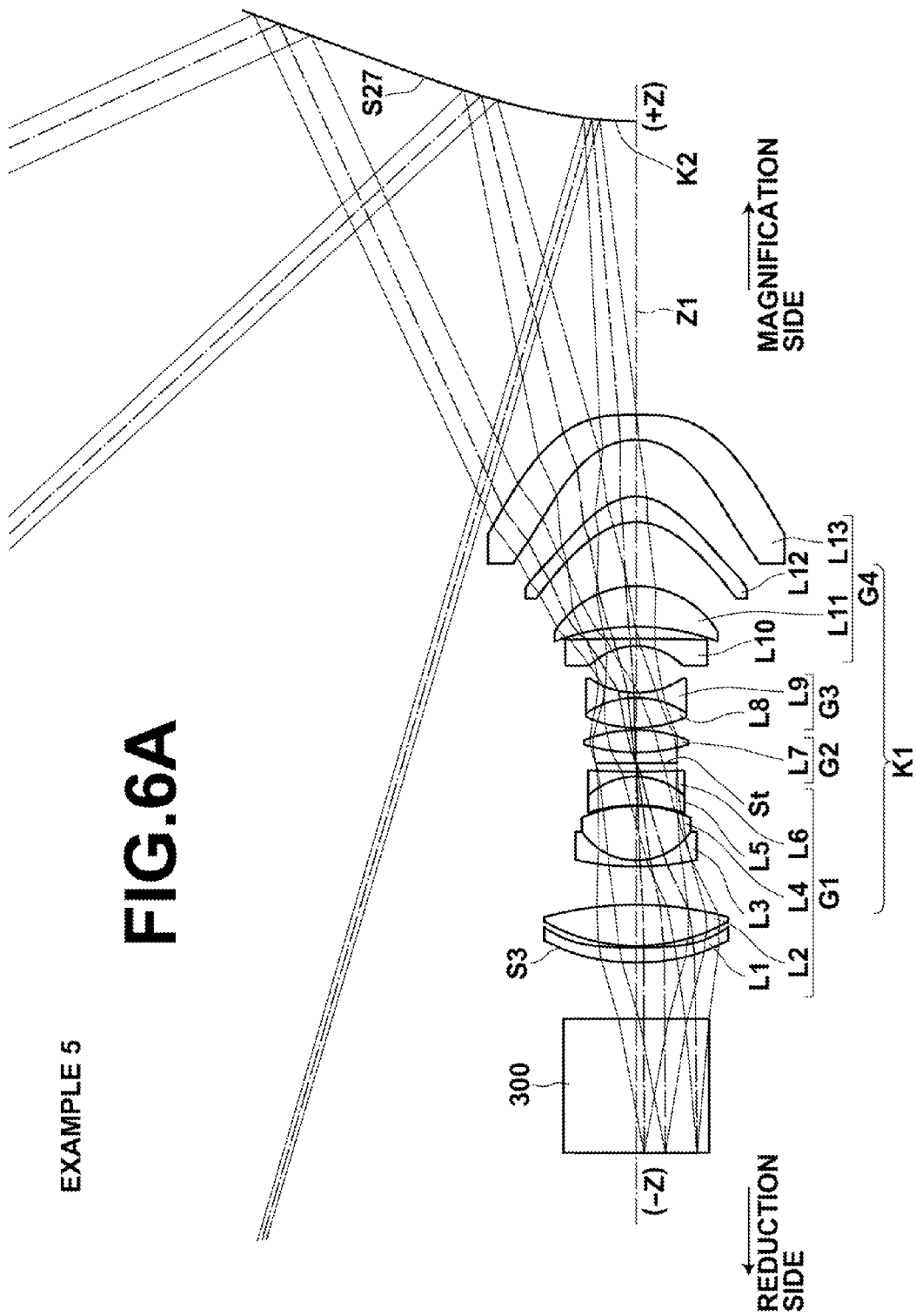

FIG.6B
EXAMPLE 5   DISTORTION
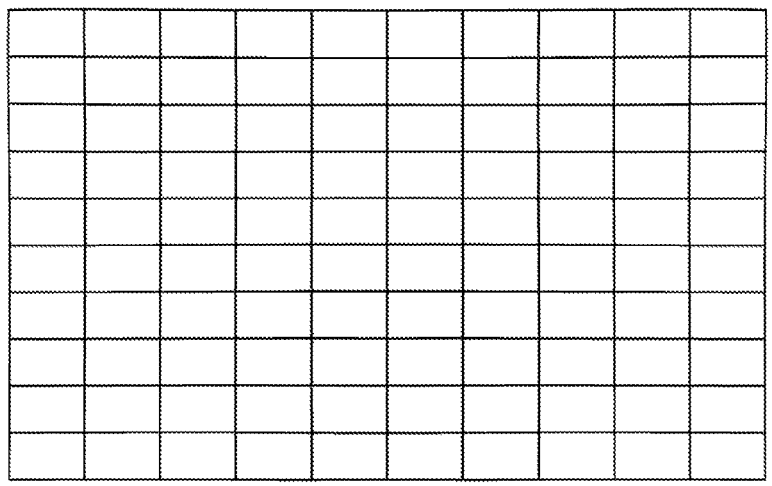
FIG.6C
EXAMPLE 5   SPOT DIAGRAMS (SIZE: 5 mm/SQUARE)
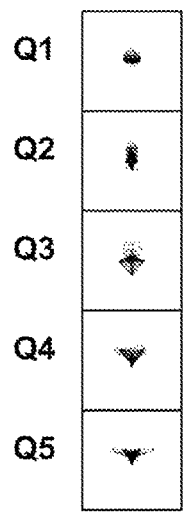
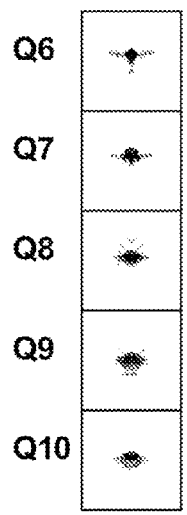
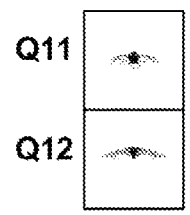

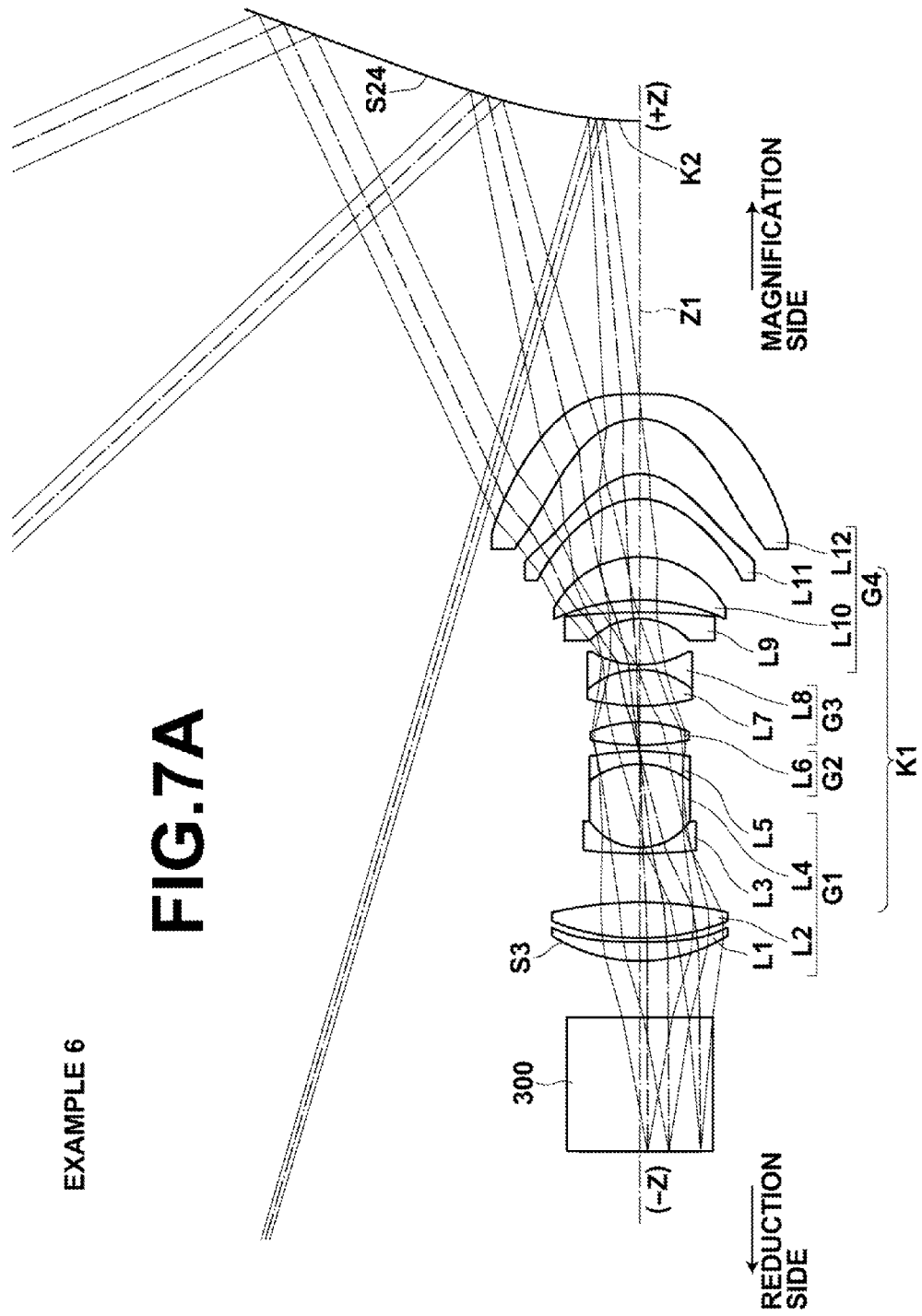

FIG.7B
EXAMPLE 6    DISTORTION
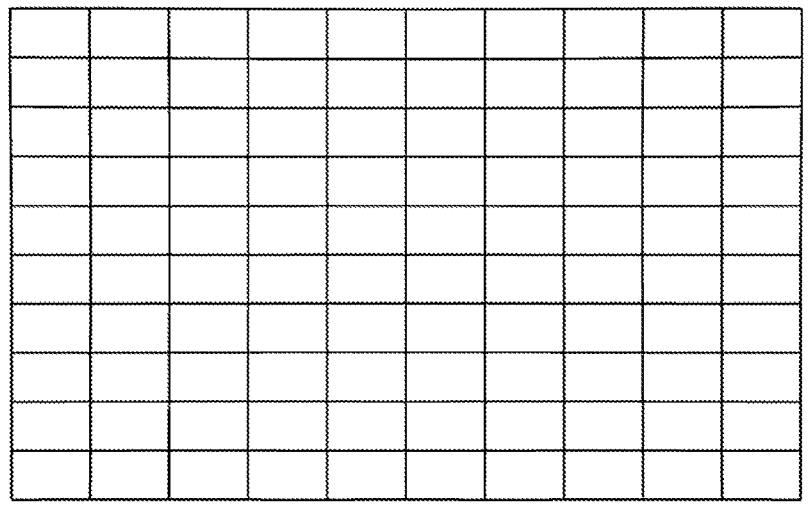
FIG.7C
EXAMPLE 6    SPOT DIAGRAMS (SIZE: 5 mm/SQUARE)
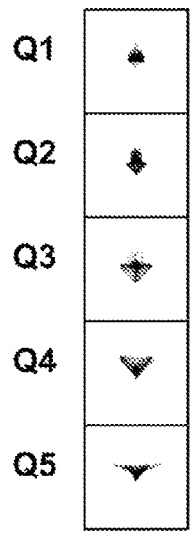
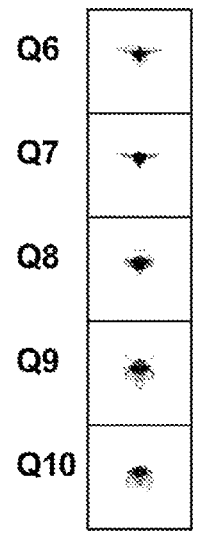
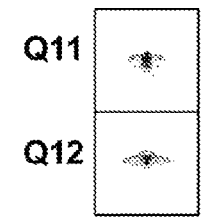

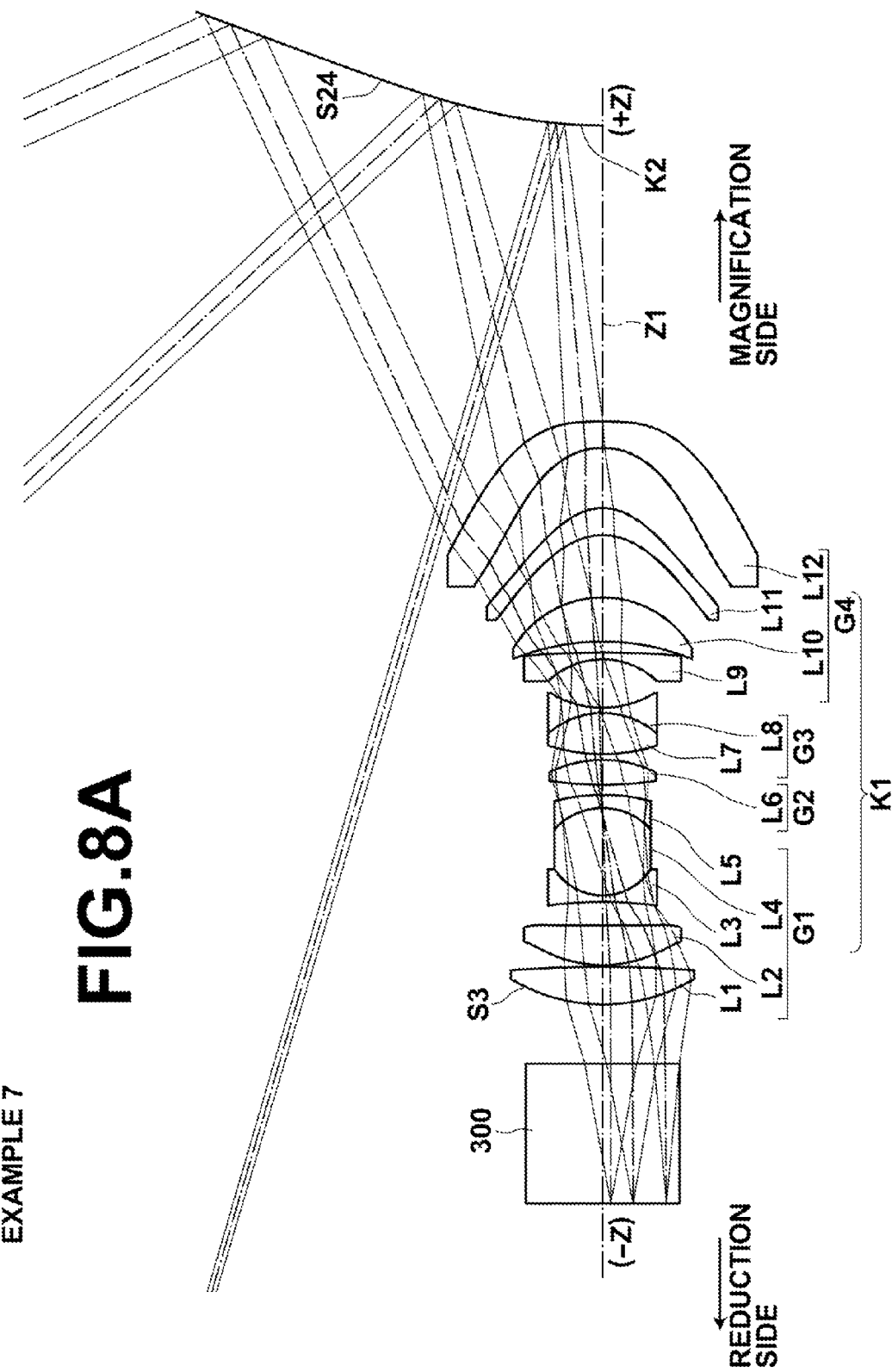

EXAMPLE 7    DISTORTION

EXAMPLE 7    SPOT DIAGRAMS (SIZE: 5 mm/SQUARE)

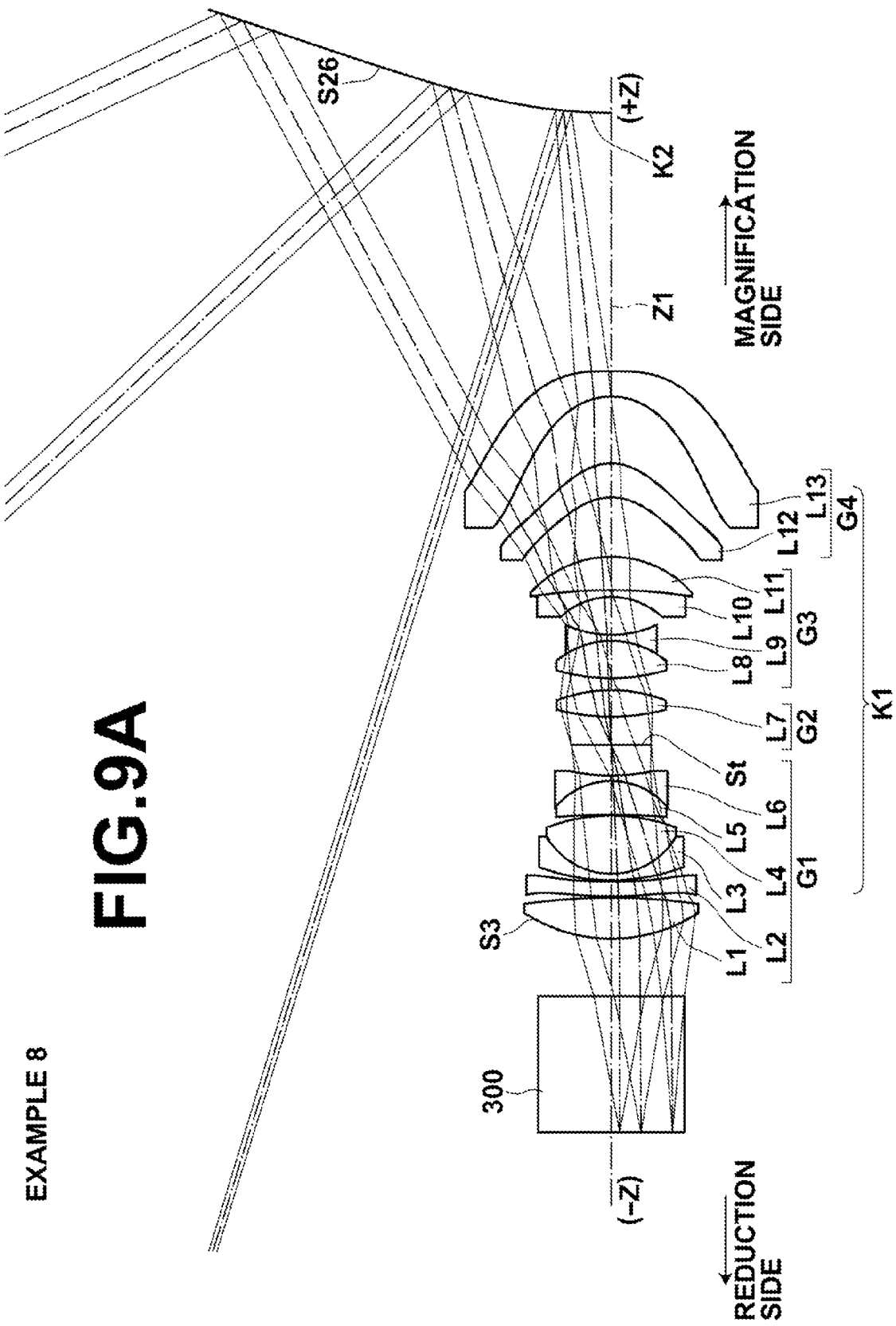

FIG.9B
EXAMPLE 8    DISTORTION
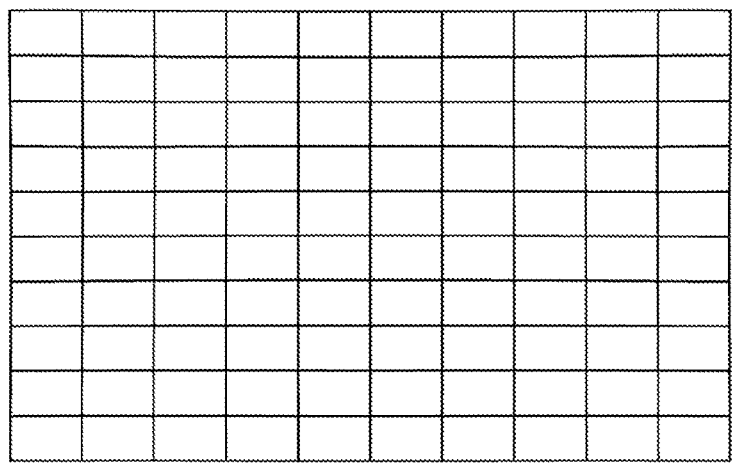
FIG.9C
EXAMPLE 8    SPOT DIAGRAMS (SIZE: 5 mm/SQUARE)
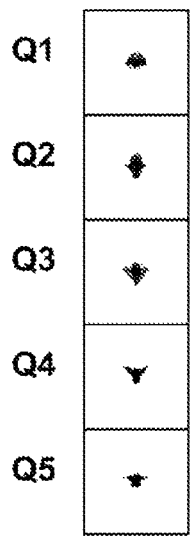 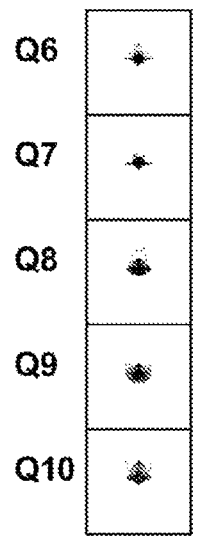 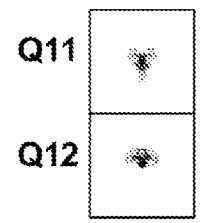

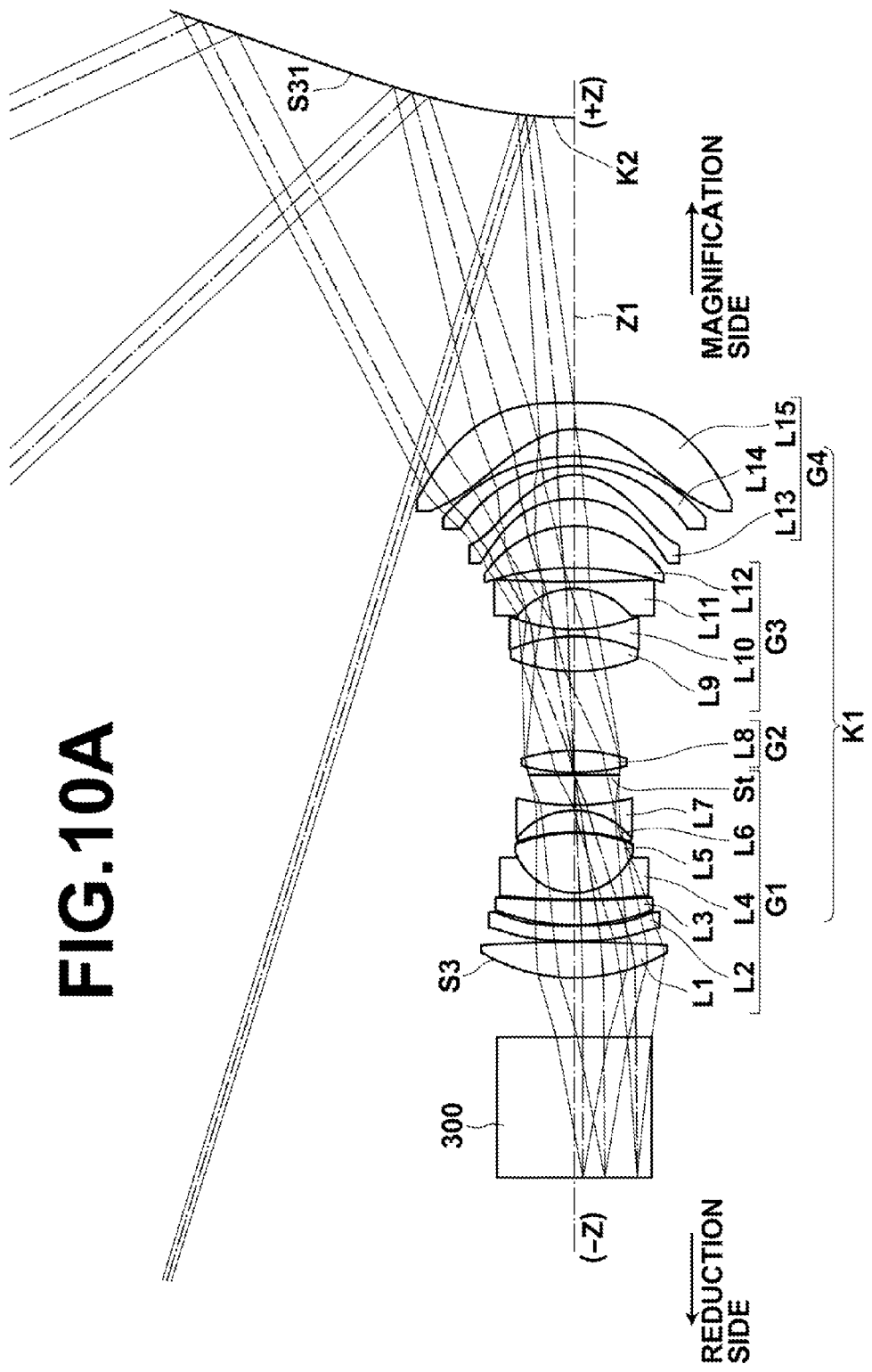

FIG.10B
EXAMPLE 9    DISTORTION
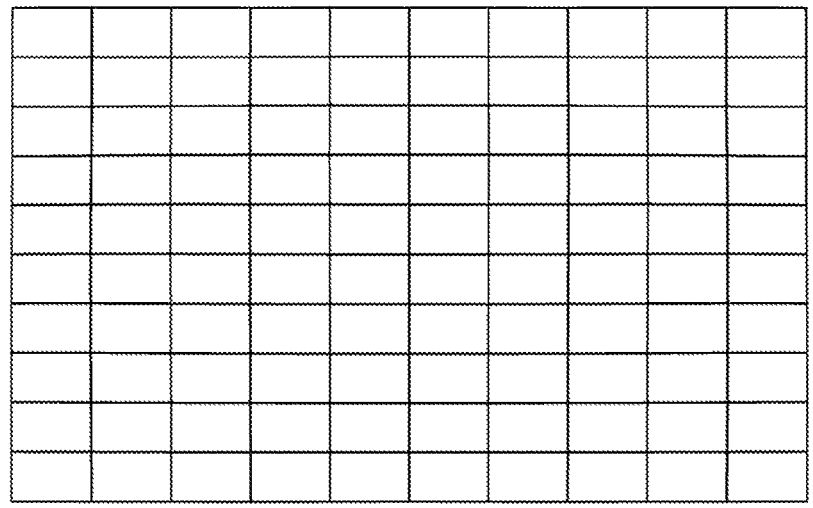
FIG.10C
EXAMPLE 9    SPOT DIAGRAMS (SIZE: 5 mm/SQUARE)
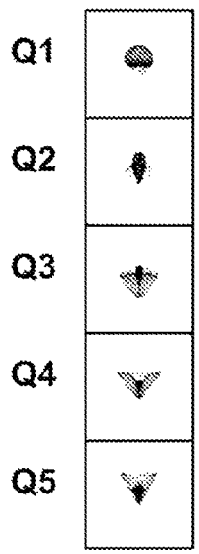
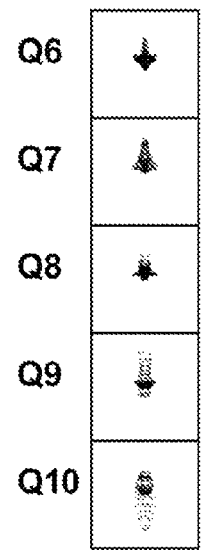
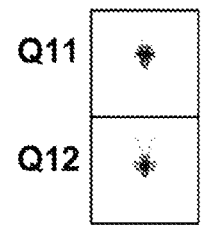

PROJECTION OPTICAL SYSTEM AND PROJECTION DISPLAY APPARATUS

CROSS REFERENCE TO RELATED APPLICATIONS

This application is a Bypass continuation of PCT/JP2012/001867 filed on Mar. 16, 2012, which claims foreign priority to Japanese Application No. 2011-069285 filed Mar. 28, 2011. The entire contents of each of the above applications are hereby incorporated by reference.

BACKGROUND OF THE INVENTION

1. Field of the Invention

The present invention relates to a projection optical system in which a lens and a reflection mirror are arranged, and a projection display apparatus using the same.

2. Description of the Related Art

Projection display apparatuses (also called as projectors) for projecting an image displayed on a light valve have been spreading widely in recent years.

Projection optical systems used in such projectors are generally required to have a long back focus and the entrance pupil viewed from the reduction side (light valve side) needs to be sufficiently in the distance, i.e., the reduction side is required to have telecentricity.

Further, with the recent performance improvement of light valves, good aberration correction appropriate for the resolution of the light valve is demanded for the projection optical system. Further, brighter and wider angle projection optical systems are strongly demanded in consideration of the use in bright and narrow indoor spaces for presentations and the like.

As projection optical systems capable of responding to such demand, projection optical systems that combine a first optical system which is a dioptric system composed of a plurality of lenses and a second optical system which is a catoptric system composed of a convex mirror are known as described, for example, in Japanese Unexamined Patent Publication No. 2010-204328 (Patent Document 1) and Japanese Unexamined Patent Publication No. 2010-072374 (Patent Document 2).

For a projection optical system composed only of an ordinary dioptric system, if an attempt is made to broaden the angle of view by reducing the focal length, the lens size on the magnification side inevitably becomes excessively large. In the mean time, a projection optical system composed of a dioptric system and a catoptric system can be made relatively small in comparison with a projection optical system composed only of a dioptric system and is, therefore, suitable for broadening the angle of view by reducing the focal length.

SUMMARY OF THE INVENTION

The projection optical system described in Patent Document 1 performs focus adjustment by moving some of the lenses in the dioptric system on the optical axis when the projection distance is changed and is unable to sufficiently minimize fluctuations in aberrations.

The projection optical system described in Patent Document 2 moves the lenses in various directions other than the optical axis directions at the time of focus adjustment, so that the focus adjustment mechanism is complicated and extremely difficult to assemble.

The present invention has been developed in view of the circumstances described above, and it is an object of the present invention to provide a projection optical system capable of satisfactorily correcting various types of aberrations that occur at the time of focus adjustment and a projection display apparatus using the same.

A projection optical system of the present invention is a projection optical system for magnifying and projecting an image formed on a conjugate plane on the reduction side to a conjugate plane on the magnification side, the projection optical system substantially consisting of a first optical system composed of a plurality of lens groups and a second optical system composed of one reflection mirror having a convex aspherical surface arranged in this order from the reduction side, wherein:

all optical surfaces constituting the first and second optical systems are formed so as to have rotationally symmetrical shapes around one common axis;

the projection optical system is configured such that focus adjustment is performed by individually moving two lens groups in the first optical system along the common axis; and the lens disposed on the most magnification side in the reduction side lens group of the two lens groups is a lens having a convex surface on the magnification side.

The lens disposed on the most magnification side in the magnification side lens group of the two lens groups may be a lens having a concave surface on the magnification side or a lens having a convex surface on the magnification side.

The reduction side lens group may be composed of one positive single lens.

The magnification side lens group may have at least a cemented lens formed by cementing a negative lens and a positive lens.

Preferably, the projection lens system is configured such that the reduction side of the entire lens system has telecentricity.

The term "telecentric on the reduction side" as used herein refers to, with respect to light fluxes emitted from arbitrary points on a conjugate plane on the reduction side and converged on a conjugate plane on the magnification side, that the angle bisector line on each luminous flux cross-section of the luminous flux emitted from the conjugate plane on the reduction side is nearly parallel with the optical axis. That is, this is not limited to the case of complete telecentricity, i.e., the angle bisector line is exactly parallel with the optical axis, and includes the case in which the angle bisector line is nearly parallel with the optical axis with some errors. The term "with some errors" as used herein refers to that the inclination of the angle bisector line with respect to the optical axis is within ±3°.

The luminous flux cross-section described above is a cross-section cut by a plane passing the optical axis. The angle bisector line is a bisecting line that divides the divergence angle on each luminous flux cross-section of the luminous flux emitted from the conjugate plane on the reduction side into equal halves.

A projection display apparatus of the present invention is a projection display apparatus, including a light source, a light valve, an illumination optical unit for guiding a luminous flux from the light source to the light valve, and the projection optical system described above, wherein the luminous flux from the light source is optically modulated by the light valve and projected onto a screen through the projection optical system.

According to the projection optical system and projection display apparatus of the present invention, all optical surfaces constituting the first optical system composed of a plurality of lens groups and second optical system composed of one reflection mirror having a convex aspherical surface are formed so as to have rotationally symmetrical shapes around one common axis, the projection optical system is configured such that focus adjustment is performed by individually moving two lens groups in the first optical system on the axis, and the lens disposed on the most magnification side of those in one of the two lens groups disposed on the reduction side is a lens having a convex surface on the magnification side. This allows aberrations that occur at the time of focus adjustment to be corrected satisfactorily.

That is, the projection optical system is configured such that focus adjustment is performed by individually moving two lens groups in the first optical system on the common axis, in which focus adjustment is performed by the reduction side lens group of the two lens groups and aberrations arising from the focus adjustment is corrected by the magnification side lens group, so that aberrations may be correction satisfactorily. In particular, the amount of movement of the reduction side lens group may be reduced when projection distance is changed by using a lens having a convex surface on the magnification side as the lens on the most magnification side in the reduction side lens group. This allows the occurrence of aberrations associated with a change in the projection distance to be minimized.

Further, in the case where a lens having a concave surface on the magnification side is used as the lens disposed on the most magnification side in the magnification side lens group of the two lens groups, a function to cancel aberrations (in particular, field curvature in the meridional direction) occurred in the lenses on the reduction side may be imparted.

Still further, in the case where a lens having a convex surface on the magnification side is used as the lens disposed on the most magnification side in the magnification side lens group of the two lens groups, the aberration balance between peripheral and central portions of a magnified and projected image may be maintained favorably.

BRIEF DESCRIPTION OF THE DRAWINGS

FIG. 1 is a diagram of a projection optical system according to an embodiment of the present invention and a projection display apparatus using the same, schematically illustrating the configuration thereof.

FIG. 2A is a cross-sectional view of a projection optical system of Example 1.

FIG. 2B illustrates distortion of the projection optical system of Example 1.

FIG. 2C illustrates spot diagrams of the projection optical system of Example 1.

FIG. 3A is a cross-sectional view of a projection optical system of Example 2.

FIG. 3B illustrates distortion of the projection optical system of Example 2.

FIG. 3C illustrates spot diagrams of the projection optical system of Example 2.

FIG. 4A is a cross-sectional view of a projection optical system of Example 3.

FIG. 5A is a cross-sectional view of a projection optical system of Example 4.

FIG. 5B illustrates distortion of the projection optical system of Example 4.

FIG. 5C illustrates spot diagrams of the projection optical system of Example 4.

FIG. 6A is a cross-sectional view of a projection optical system of Example 5.

FIG. 6B illustrates distortion of the projection optical system of Example 5.

FIG. 6C illustrates spot diagrams of the projection optical system of Example 5.

FIG. 7A is a cross-sectional view of a projection optical system of Example 6.

FIG. 7B illustrates distortion of the projection optical system of Example 6.

FIG. 7C illustrates spot diagrams of the projection optical system of Example 6.

FIG. 8A is a cross-sectional view of a projection optical system of Example 7.

FIG. 9A is a cross-sectional view of a projection optical system of Example 8.

FIG. 9B illustrates distortion of the projection optical system of Example 8.

FIG. 9C illustrates spot diagrams of the projection optical system of Example 8.

FIG. 10A is a cross-sectional view of a projection optical system of Example 9.

FIG. 10B illustrates distortion of the projection optical system of Example 9.

FIG. 10C illustrates spot diagrams of the projection optical system of Example 9.

DESCRIPTION OF THE PREFERRED EMBODIMENTS

Hereinafter, a projection optical system of the present invention and a projection display apparatus having the projection optical system will be described with reference to the accompanying drawings.

Figure 12:
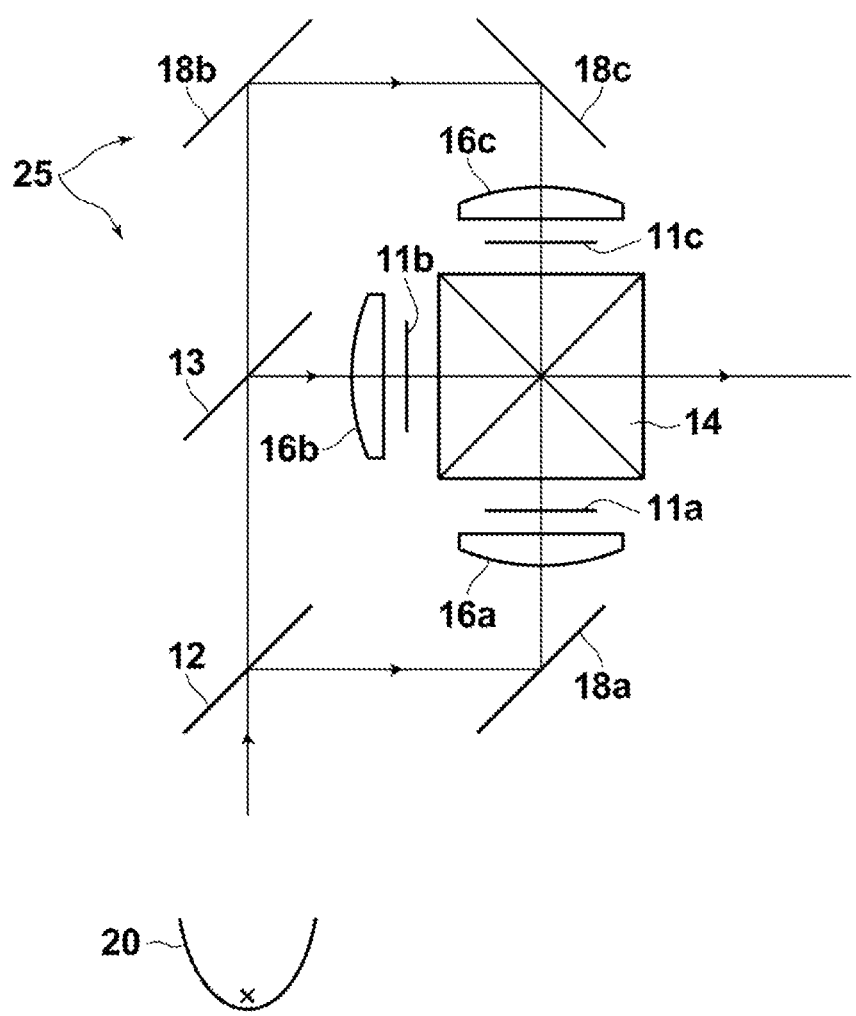
FIG. 12 illustrates a projection optical modulation unit of a projection display apparatus in an embodiment of the present invention.

FIG. 1 is a cross-sectional view of a projection optical system according to an embodiment of the present invention and a projection display apparatus using the same, schematically illustrating the configuration thereof. FIG. 12 illustrates a projection optical modulation unit 300.

The projection optical system 100 of the present invention illustrated in FIG. 1 is a projection optical system for magnifying and projecting an image G formed on a conjugate plane Cps on the reduction side(i.e., on an image forming surface Hm of a display element) to a conjugate plane Cpk on the magnification side(i.e., to a screen 1).

The projection optical system 100 substantially consists of a first optical system K1 which is a dioptric system composed of a plurality of lens groups and a second optical system K2 which is a catoptrics system composed of one reflection mirror having a convex aspherical surface arranged in this order from the reduction side.

All optical surfaces constituting the first optical system K1 and the second optical system K2 are formed so as to have rotationally symmetric shapes around one common axis of the optical axis Z1. That is, all optical surfaces constituting the first optical system K1 and the second optical system K2 are rotationally symmetric surfaces.

The projection optical system 100 is configured such that focus adjustment is performed by individually moving a lens group Gs and a lens group Gk, which are two lens groups in the first optical system, on the optical axis Z1. A lens La having a convex surface on the magnification side is disposed on the most magnification side in the reduction side lens group Gs of the two lens groups Gs, Gk.

Further, as the lens disposed on the most magnification side in the magnification side lens group Gk of the two lens groups Gs, Gk, a lens Lb1 having a concave surface on the magnification side or a lens Lb2 having a convex surface on the magnification side may be used.

The lens group Gs on the reduction side may be composed of one positive single lens.

The magnification side lens group Gk may have at least a cemented lens formed by cementing a negative lens and a positive lens.

Preferably, the projection optical system 100 constituted by the first optical system K1 and the second optical system K2 is configured such that the reduction side of the entire lens system has telecentricity.

A projection display apparatus of the present invention using the projection optical system described above will now be described.

A projection display apparatus 200 of the present invention illustrated in FIG. 1 includes a projection optical modulation unit 300 having a light source 20, a light valve 11, and the like, and the aforementioned projection optical system 100. The apparatus is configured to optically modulate a luminous flux emitted from the light source 30 with the light valve 11 and to project the optically modulated luminous flux to the screen 1 through the projection optical system 100.

The projection optical modulation unit 300 illustrated in FIG. 12 includes the light source 20, transmissive liquid crystal panels 11a, 11b, and 11c, which are light valves, an illumination optical unit 25 for guiding a luminous flux emitted from the light source 20 to each of the transmissive liquid crystal panels 11a to 11c, and a cross dichroic prism 14 which is a luminous flux combining optical system for combining luminous fluxes passing through the transmissive liquid crystal panels 11a to 11c. The illumination optical unit 25 includes an integrator (not shown) such as a fly's eye disposed between the light source 20 and dichroic mirror 12.

A white luminous flux emitted from the light source 20 is separated into three luminous fluxes of different colors (G light, B light, R light) through the illumination optical unit 25 and separated luminous fluxes are inputted to the corresponding liquid crystal panels 11a to 11c and optically modulated.

The respective luminous fluxes optically modulated through the liquid crystal panels 11a to 11c are color-combined by the cross dichroic prism 14 and the combined luminous flux is projected onto the screen 1 through the projection optical system 100.

The illumination optical unit 25 of the projection optical modulation unit 300 includes dichroic mirrors 12, 13 for color separation, total reflection mirrors 18a, 18b, 18c, and condenser lenses 16a, 16b, 16c.

The projection optical modulation unit 300 is not limited to that using the transmissive liquid crystal display panels described above, and other optical modulation means, such as reflective liquid crystal display panels, DMDs, or the like may also be employed.

EXAMPLES

Hereinafter, specific Examples 1 to 9 of the projection optical system of the present invention will be described with reference to FIGS. 2A, 2B, 2C, 3A, 3B, 3C, - - - 10A, 10B, 10C, 11, and Tables 1A, 1B, 2A, 2B, - - - 9A, 9B, 10.

Figure 11:
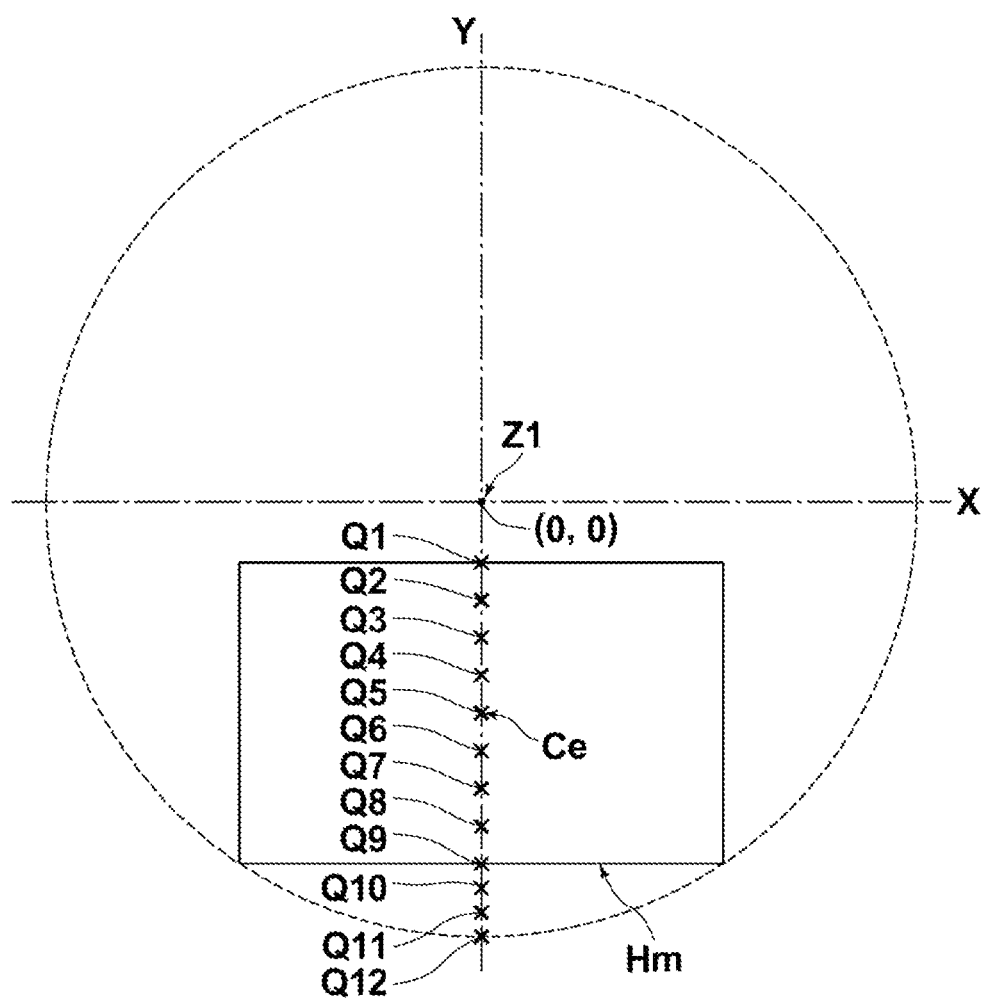
FIG. 11 illustrates positions on a conjugate plane on the reduction side from which the spot diagrams are obtained.

FIGS. 2A, 3A, - - - , and 10A are cross-sectional views of the projection optical systems of the respective examples. FIGS. 2B, 3B, - - - , and 10B illustrate distortions representing optical performance of the projection optical systems of the respective examples. FIGS. 2C, 3C, - - - , and 10C illustrate spot diagrams representing optical performance of the projection optical systems of the respective examples. FIG. 11 illustrates positions on a conjugate plane on the reduction side from which the spot diagrams are obtained.

Tables 1A, 2A, - - - , and 9A show lens data of the projection optical systems of the respective examples. Tables 1B, 2B, - - - , and 9B show aspherical surface data representing the shapes of aspherical surfaces constituting the projection optical systems of the respective examples.

Each of the projection optical systems of Examples 1 to 9 which will be described herein below substantially consists of a first optical system K1 composed of a plurality of lens groups and a second optical system K2 composed of one reflection mirror having a convex aspherical surface arranged in this order from the reduction side, in which an image G formed on a conjugate plane on the reduction side is magnified and projected onto a conjugate plane on the magnification side.

In each of projection optical systems of Examples 1 to 9, all optical surfaces constituting the first optical system K1 and the second optical system K2 are formed so as to have rotationally symmetric shapes around one common axis, and each projection optical system is configured such that focus adjustment is performed by individually moving a second lens group G2 and a third lens group G3 which are two lens groups in the first optical system K1 along the optical axis Z1. Further, the lens disposed on the most magnification side in the lens group G2 which is the reduction side lens group of the two lens groups described above is a lens having a convex surface on the magnification side.

Although not an essential composition, the second lens group G2 of each of the projection optical systems of Examples 1 to 9 is composed of one positive single lens. Further, the third lens group G3 has at least a cemented lens formed by cementing a negative lens and a positive lens. The projection optical system is configured such that the reduction side of the entire lens system has telecentricity.

Note that each of the projection optical systems of Examples 1 to 7 to be described later has a lens having a concave surface on the magnification side on the most magnification side in the third lens group G3 which is the magnification side lens group described above.

In the mean time, each of the projection optical systems of Examples 8 and 9 has a lens having a convex surface on the magnification side on the most magnification side in the third lens group G3 which is the magnification side lens group described above.

In each drawing illustrating each example, components identical and corresponding to those of the projection optical system 100 described above are given the same reference symbols and will not be elaborated upon further here.

The projection optical modulation unit 300 shown in each drawing has the same configuration as that of the projection optical modulation unit 300 already described and shown in FIGS. 1 and 12, and will not be elaborated upon further here.

Aspherical surface coefficients of the projection optical systems of Examples 1 to 9 shown in Tables 1B, - - - , and 9B are created such that aspherical surfaces are determined when applied to an aspherical surface expression given below:

$$Z = \frac{Y^2/R}{1 + (1 - K \cdot Y^2/R^2)^{1/2}} + \sum_{i=3}^{n} Ai \cdot Y^i$$

where,

Z is a depth of aspherical surface (length of perpendicular line from a point on an aspherical surface at height Y to a tangent plane to the vertex of the aspherical surface perpendicular to the optical axis) (mm);

Y is a height (distance from the optical axis) mm;

R is a paraxial radius of curvature (mm); and

K, Ai are aspherical surface coeffients (i=3 to n).

Example 1

FIG. 2A is a cross-sectional view of a projection optical system of Example 1, illustrating the cross-section thereof.

The projection optical system of Example 1 substantially consists of a first optical system K1 composed of four lens groups and a second optical system K2 which is an aspherical reflection mirror arranged in this order from the reduction side.

As illustrated in FIG. 2A, the first optical system K1 has four lens groups (first lens group G1 to fourth lens group G4). When the projection distance is changed, two lens groups (second lens group G2 and third lens group G3) are individually moved along the optical axis Z1 for focus adjustment.

The first optical system K1 is composed of a first lens group G1 constituted by six lenses indicated by symbols L1, L2, l3, L4, L5, L6 in the drawing, a second lens group G2 constituted by one lens indicated by a symbol L7, a third lens group G3 constituted by two lenses indicated by symbols L8, L9, and a fourth lens group G4 constituted by four lenses indicated by symbols L10, L11, L12, L13 arranged in this order from the reduction side. Note that an aperture stop St is associated with the first lens group G1. The reduction side lens surface S3 of the lens L1 indicated by the symbol L1 corresponds to the surface number 3 and the reflection surface S27 of the second optical system K2 corresponds to the surface number 27 (refer to Table 1A).

Next, Tables 1A and 1B that respectively indicate lens data and aspherical surface coefficients of the projection optical system of Example 1 will be described.

TABLE 1A

Example 1

Lens Data

| Surface No. | R | D | Nd | vd |
|---|---|---|---|---|
| 1 | ∞ | 32.0000 | 1.5163 | 64.14 |
| 2 | ∞ | 13.5576 | | |
| 3 | 38.1204 | 10.2898 | 1.8052 | 25.42 |
| 4 | −104.1912 | 0.4006 | | |
| 5* | 231.1613 | 3.5006 | 1.4910 | 57.58 |
| 6* | 139.9131 | 0.5066 | | |
| 7 | 33.0349 | 1.4509 | 1.6889 | 31.07 |
| 8 | 17.6985 | 13.5331 | 1.4970 | 81.54 |
| 9 | −43.1689 | 0.1997 | | |
| 10 | −148.3689 | 7.9447 | 1.6779 | 55.34 |
| 11 | −17.1134 | 1.2004 | 1.8052 | 25.42 |
| 12 | 35.8857 | 5.5800 | | |
| 13(Aperture) | ∞ | D13 | | |
| 14 | 61.2724 | 5.7483 | 1.7859 | 44.20 |
| 15 | −35.2129 | D15 | | |
| 16 | 36.4717 | 8.5159 | 1.5955 | 39.24 |
| 17 | −22.6134 | 1.2504 | 1.8340 | 37.16 |
| 18 | 26.5447 | D18 | | |

TABLE 1A-continued

Example 1

| 19 | −21.2023 | 1.5506 | 1.5163 | 64.14 |
|---|---|---|---|---|
| 20 | −1299.4069 | 2.5899 | | |
| 21 | −63.7842 | 9.1796 | 1.8052 | 25.42 |
| 22 | −25.6386 | 11.0333 | | |
| 23* | −13.4421 | 6.6884 | 1.4910 | 57.58 |
| 24* | −11.5276 | 12.8589 | | |
| 25* | −17.7885 | 6.1068 | 1.4910 | 57.58 |
| 26* | −264.3841 | 70.7012 | | |
| 27* | 105.5115 | D27 | (Reflection Surface) | |

Varied Air Space

| D13 | 8.3076 | 8.4272 | 8.6417 |
|---|---|---|---|
| D15 | 0.5437 | 0.5276 | 0.4985 |
| D18 | 11.4433 | 11.3398 | 11.1544 |
| D27 | −490.0000 | −573.0000 | −818.5000 |

*Aspherical

A radius of curvature R of an optical surface of each of the optical members constituting the projection optical system of Example 1, a thickness of each of the optical members on the optical axis Z1, an air space D between each of the lenses on the optical axis Z1, and a refractive index Nd and an Abbe number vd of each of the optical members with respect to d-line are shown in the upper side of Table 1A. Note that the radii of curvature of the aspherical surfaces are those in the paraxial region. Further, the lens data include the projection optical modulation unit 300 as a plane parallel plate.

Values of the radii of curvature R and the air spaces D are actual lengths (in mm unit).

The numbers under the "Surface No." in Table 1A are surface numbers of optical members (lens surfaces, aperture stop, reflection mirror, and the like) which are sequentially increased from the reduction side to the magnification side. Values under the symbols "R", "D", "Nd", and "vd" are values indicated in association with the "Surface No.".

The values under the "Nd" represent refractive indices of the respective optical elements (lenses) whose surface numbers are sequentially increased from the reduction side to the magnification side with respect to d-line. The values under the "vd" represent Abbe numbers of the respective optical elements (lenses) whose surface numbers are sequentially increased from the reduction side to the magnification side with reference to d-line.

Further, the air space between each group which varies with focus adjustment according to the projection distance is shown in the lower side of Table 1A (D13, D15, and D18, here). Note that the distance (D27, here) between the reflection surface and the conjugate plane on the magnification surface (screen 1) is indicated as a negative value as the light is reflected and the propagation direction of the light is reversed.

Here, the distance between the reflection surface and the conjugate plane on the magnification side is the distance from the surface vertex of the reflection surface (intersection point between the reflection surface and the optical axis Z1) to the conjugate plane on the magnification side. Note that the value of the varied air space between each group shown in the lower side of Table 1A is an actual length (mm).

Further, each aspherical surface coefficient representing the shape of each aspherical surface constituting the projection optical system of Example 1 is shown in Table 1B given below.

TABLE 1B

Example 1
Aspherical Surface Coefficient

| Symbol | Surface No. | | | | | | |
|---|---|---|---|---|---|---|---|
| | 5* | 6* | 23* | 24* | 25* | 26* | 27* |
| K   | −5.17118E+02 |  5.13212E+01 |  2.47865E−01 |  1.58995E−01 | −2.96840E+00 | −2.11564E+19 |  7.60649E−01 |
| A3  | −2.02572E−05 | −4.71920E−05 | −8.80375E−05 | −2.66110E−04 | −9.03215E−04 | −7.73204E−04 | −2.31355E−05 |
| A4  | −4.85008E−06 |  5.60668E−06 |  1.57319E−05 |  6.47256E−05 | −1.91850E−05 | −2.34330E−05 | −1.27551E−07 |
| A5  | −2.15724E−08 |  1.05744E−07 |  1.64836E−06 | −7.78050E−07 |  3.77324E−07 |  1.68221E−06 |  5.85990E−08 |
| A6  |  9.74768E−09 |  1.45260E−09 | −1.68939E−08 | −7.59867E−09 |  9.54829E−09 | −2.28809E−08 | −2.39509E−09 |
| A7  | −2.86523E−10 | −3.20172E−11 | −2.32269E−09 |  8.12309E−10 |  1.39154E−10 | −4.49670E−10 |  1.80846E−11 |
| A8  | −3.00427E−11 | −2.98077E−12 | −4.79864E−11 |  1.37898E−11 |  3.19468E−12 |  1.03880E−12 |  7.77876E−13 |
| A9  | −7.73194E−13 | −5.62949E−13 |  4.13562E−12 | −2.11787E−13 |  1.23243E−13 |  2.51127E−13 | −1.83675E−14 |
| A10 |  1.12009E−14 | −1.40760E−13 |  2.02517E−13 | −1.94450E−14 |  3.60020E−15 |  6.10172E−15 |  1.03035E−16 |
| A11 |  2.09139E−15 | −3.69880E−15 |  1.25107E−15 | −2.10435E−16 |  1.31120E−16 |  3.06527E−17 |  1.83993E−19 |
| A12 | −1.06654E−17 |  2.05956E−16 | −7.32670E−16 |  2.61860E−17 |  1.75130E−18 | −1.66346E−18 |  1.38247E−20 |
| A13 | −2.37973E−19 |  9.17336E−19 |  4.36738E−18 | −5.13486E−19 |  5.63254E−21 | −9.24817E−20 | −2.34464E−22 |
| A14 | −1.95328E−20 |  1.62330E−19 |  2.52835E−19 | −7.70995E−21 | −1.98584E−21 | −2.45621E−21 | −5.22611E−25 |
| A15 | −2.26641E−21 |  7.11570E−21 |  4.70681E−21 |  2.68068E−22 | −9.04328E−23 | −3.60021E−23 |  4.19015E−27 |
| A16 |  1.42842E−22 | −9.96147E−22 | −3.69318E−23 |  1.83931E−23 | −3.90284E−24 |  3.33498E−25 |  4.01782E−28 |
| A17 | | |  3.35169E−23 |  1.29543E−24 | −1.22258E−25 |  4.19190E−26 | −3.05002E−30 |
| A18 | | | −1.61290E−24 |  3.74238E−26 | −2.63731E−27 |  1.40872E−27 | −2.49744E−32 |
| A19 | | | −2.50426E−26 |  2.50679E−29 | −1.35277E−29 |  2.09071E−29 |  3.50844E−34 |
| A20 | | |  2.21295E−27 | −6.19800E−29 |  4.47096E−30 | −1.04461E−30 | −1.06818E−36 |

FIG. 2B, 2C illustrate distortion and spot diagrams of the projection optical system of Example 1 respectively.

FIG. 2B is a drawing that indicates the distortion of projection optical system of Example 1 as a distortion of distortion grid extending over the entire projectable range. It is known from FIG. 2B that the distortion of the grid is a visually unrecognizable level over the entire projectable range.

FIG. 2C illustrates, as spot diagrams, point images obtained by projecting points on a conjugate plane on the reduction side to a conjugate plane on the magnification side.

Symbols Q1, Q2, - - -, and Q12 shown on the left side of frames enclosing the respective spot diagrams correspond to positions on the conjugate plane Cps (image forming surface Hm).

More specifically, as shown in FIG. 11 which illustrates the appearance of the image forming surface Hm (conjugate plane Cps on the reduction side) viewed from the magnification side, positions on the conjugate plane Cps on the reduction side for obtaining spot diagrams are twelve points of Q1 to Q12 which are set so as to traverse longitudinally in the Y axis direction (direction passing through the optical axis Z1 and orthogonal thereto) on the image forming surface Hm. The positions Q1 to Q12 are set such that the greater the number in the symbol, the greater the absolute value of the Y coordinate. Spot diagrams in the frames indicated by the symbols Q1 to Q12 in FIG. 2C are obtained according to the positions represented by the symbols Q1 to Q12 in FIG. 11. Note that, in FIG. 11, the position of the optical axis Z1 is set at the origin (0, 0) which is the intersection point of the X axis and Y axis, and the positions Q1 to Q12 are set so as to longitudinally traverse on the image forming surface Hm in the lower side of the origin in the drawing along the Y axis. Here, the position Q1 is set at the top of the range of the image forming surface Hm in FIG. 11, the position Q9 is set at the bottom of the range of the image forming surface Hm, and the position Q5 is set at the center Ce of the range of the image forming surface Hm.

As is clear from Tables 1A, 1B and FIGS. 2A, 2B, 2C, and the like, the projection optical system of Example 1 is a projection optical system capable of satisfactorily correcting various types of aberrations that occur at the time of focus adjustment.

Note that the above descriptions of how to understand the lens data, spot diagrams, drawings indicating distortion and the like, and tables apply also to Examples 2 to 9 described herein below.

Example 2

FIG. 3A is a cross-sectional view of a projection optical system of Example 2, illustrating the cross-section thereof.

The projection optical system of Example 2 also substantially consists of a first optical system K1 composed of four lens groups (first lens group G1 to fourth lens group G4) and a second optical system K2 which is an aspherical reflection mirror arranged in this order from the reduction side.

As illustrated in FIG. 3A, also in the first optical system K1 of Example 2, focus adjustment is performed by individually moving two lens groups (second lens group G2, third lens group G3) along a direction of the optical axis Z1 when the projection distance is changed.

The first optical system K1 is composed of a first lens group G1 constituted by six lenses indicated by symbols L1, L2, l3, L4, L5, L6 in the drawing, a second lens group G2 constituted by one lens indicated by a symbol L7, a third lens group G3 constituted by two lenses indicated by symbols L8, L9, and a fourth lens group G4 constituted by four lenses indicated by symbols L10, L11, L12, L13 arranged in this order from the reduction side. Note that an aperture stop St is associated with the first lens group G1. The reduction side lens surface S3 of the lens L1 indicated by the symbol L1 corresponds to the surface number 3 and the reflection surface S27 of the second optical system K2 corresponds to the surface number 27 (refer to Table 2A). Tables 2A, 2B that respectively indicate lens data and aspherical surface coefficients of the projection optical system of Example 2 are given below.

TABLE 2A

Example 2

Lens Data

| Surface No. | R | D | Nd | vd |
|---|---|---|---|---|
| 1 | ∞ | 32.0000 | 1.5163 | 64.14 |
| 2 | ∞ | 13.5649 | | |
| 3 | 38.9322 | 9.9291 | 1.8052 | 25.42 |
| 4 | −100.8997 | 0.3009 | | |
| 5* | 160.3467 | 3.5000 | 1.4910 | 57.58 |
| 6* | 144.1330 | 0.5832 | | |
| 7 | 38.0917 | 1.4507 | 1.6398 | 34.46 |
| 8 | 17.8153 | 13.5111 | 1.4970 | 81.54 |
| 9 | −38.7799 | 0.2010 | | |
| 10 | −120.6792 | 7.8123 | 1.6516 | 58.55 |
| 11 | −17.3849 | 1.1994 | 1.8052 | 25.42 |
| 12 | 37.4174 | 5.8800 | | |
| 13(Aperture) | ∞ | D13 | | |
| 14 | 67.9099 | 5.3851 | 1.7725 | 49.60 |
| 15 | −35.2544 | D15 | | |
| 16 | 39.5852 | 8.6990 | 1.5481 | 45.79 |
| 17 | −21.5727 | 1.2508 | 1.7859 | 44.20 |
| 18 | 29.5920 | D18 | | |
| 19 | −23.2275 | 1.5491 | 1.5163 | 64.14 |
| 20 | 987.5693 | 2.6480 | | |
| 21 | −75.5954 | 10.0741 | 1.8052 | 25.42 |
| 22 | −26.1429 | 9.0981 | | |
| 23* | −13.1472 | 6.6337 | 1.4910 | 57.58 |
| 24* | −11.5707 | 12.3840 | | |
| 25* | −17.0201 | 6.0007 | 1.4910 | 57.58 |
| 26* | −262.2886 | 65.4871 | | |
| 27* | 107.7456 | D27 | (Reflection Surface) | |

| Varied Air Space | | | |
|---|---|---|---|
| D13 | 7.8495 | 7.9850 | 8.1199 |
| D15 | 3.6932 | 3.6684 | 3.6400 |
| D18 | 10.9931 | 10.8824 | 10.7759 |
| D27 | −490.0000 | −573.0000 | −712.0000 |

*Aspherical

TABLE 2B

Example 2
Aspherical Surface Coefficient

| Symbol | Surface No. | | | | | | |
|---|---|---|---|---|---|---|---|
| | 5* | 6* | 23* | 24* | 25* | 26* | 27* |
| K | −1.63447E+02 | 5.23729E+01 | 2.35657E−01 | 1.61044E−01 | −2.84753E+00 | −2.11564E+19 | 7.65732E−01 |
| A3 | −2.60759E−06 | −2.28856E−05 | −5.10713E−05 | −2.42398E−04 | −9.01939E−04 | −7.62578E−04 | −2.24969E−05 |
| A4 | −3.90895E−06 | 6.33805E−06 | 1.21696E−05 | 6.63240E−05 | −1.96038E−05 | −2.25102E−05 | −1.31593E−07 |
| A5 | −4.14765E−08 | 9.66429E−08 | 1.98897E−06 | −7.38265E−07 | 3.73840E−07 | 1.64204E−06 | 5.86170E−08 |
| A6 | 7.38772E−09 | −1.63572E−09 | −2.34554E−08 | −6.74886E−09 | 9.62218E−09 | −2.26224E−08 | −2.39488E−09 |
| A7 | −3.95340E−10 | −1.44260E−10 | −2.37789E−09 | 8.26080E−10 | 1.46123E−10 | −4.36597E−10 | 1.80866E−11 |
| A8 | −3.42856E−11 | −3.05997E−12 | −4.44130E−11 | 1.37758E−11 | 3.57107E−12 | 1.21646E−12 | 7.77894E−13 |
| A9 | −9.13313E−13 | −5.91716E−13 | 4.30845E−12 | −2.24084E−13 | 1.39519E−13 | 2.51165E−13 | −1.83674E−14 |
| A10 | 1.14953E−14 | −1.40242E−13 | 2.06540E−13 | −2.01022E−14 | 4.25173E−15 | 6.09158E−15 | 1.03036E−16 |
| A11 | 2.25548E−15 | −3.84000E−15 | 1.23045E−15 | −2.34019E−16 | 1.54365E−16 | 2.99953E−17 | 1.83997E−19 |
| A12 | −1.26798E−17 | 2.26304E−16 | −7.41194E−16 | 2.55361E−17 | 2.54651E−18 | −1.70719E−18 | 1.38247E−20 |
| A13 | | | 3.74461E−18 | −5.24841E−19 | 3.03296E−20 | −9.42189E−20 | −2.34465E−22 |
| A14 | | | 2.20442E−19 | −7.53376E−21 | −1.26304E−21 | −2.51963E−21 | −5.22619E−25 |
| A15 | | | 3.31888E−21 | 2.94632E−22 | −7.24686E−23 | −3.79307E−23 | 4.19007E−27 |
| A16 | | | −8.60615E−23 | 2.03503E−23 | −3.57030E−24 | 2.84469E−25 | 4.01782E−28 |
| A17 | | | 3.24686E−23 | 1.39249E−24 | −1.22366E−25 | 4.09566E−26 | −3.05002E−30 |
| A18 | | | −1.58602E−24 | 4.12223E−26 | −3.10603E−27 | 1.40180E−27 | −2.49744E−32 |
| A19 | | | −1.97036E−26 | 1.64913E−28 | −4.59577E−29 | 2.15248E−29 | 3.50845E−34 |
| A20 | | | 2.67664E−27 | −5.90507E−29 | 2.77150E−30 | −9.97313E−31 | −1.06816E−36 |

FIGS. 3B, 3C illustrate distortion and spot diagrams of the projection optical system of Example 2 respectively.

As is clear from FIGS. 3A, 3B, 3C and Tables 2A, 2B, the projection optical system of Example 2 is a projection optical system capable of satisfactorily correcting various types of aberrations that occur at the time of focus adjustment.

Example 3

FIG. 4A is a cross-sectional view of a projection optical system of Example 3, illustrating the cross-section thereof.

The projection optical system of Example 3 also substantially consists of a first optical system K1 composed of four lens groups (first lens group G1 to fourth lens group G4) and a second optical system K2 which is an aspherical reflection mirror arranged in this order from the reduction side.

As illustrated in FIG. 4A, also in the first optical system K1 of Example 3, focus adjustment is performed by individually moving two lens groups (second lens group G2, third lens group G3) along a direction of the optical axis Z1 when the projection distance is changed.

The first optical system K1 is composed of a first lens group G1 constituted by six lenses indicated by symbols L1, L2, l3, L4, L5, L6 in the drawing, a second lens group G2 constituted by one lens indicated by a symbol L7, a third lens group G3 constituted by two lenses indicated by symbols L8, L9, and a fourth lens group G4 constituted by four lenses indicated by symbols L10, L11, L12, L13 arranged in this order from the reduction side. Note that an aperture stop St is associated with the first lens group G1. The reduction side lens surface S3 of the lens L1 indicated by the symbol L1 corresponds to the surface number 3 and the reflection surface S27 of the second optical system K2 corresponds to the surface number 27 (refer to Table 3A).

Tables 3A, 3B that respectively indicate lens data and aspherical surface coefficients of the projection optical system of Example 3 are given below.

TABLE 3A

Example 3

Lens Data

| Surface No. | R | D | Nd | νd |
|---|---|---|---|---|
| 1 | ∞ | 32.0000 | 1.5163 | 64.14 |
| 2 | ∞ | 13.5545 | | |
| 3 | 47.3915 | 9.1132 | 1.8467 | 23.78 |
| 4 | −95.8752 | 0.5093 | | |
| 5* | 1261.6982 | 3.9532 | 1.4910 | 57.58 |
| 6* | 132.1767 | 0.3998 | | |
| 7 | 34.5179 | 1.4491 | 1.6889 | 31.07 |
| 8 | 18.2033 | 15.4141 | 1.4970 | 81.54 |
| 9 | −38.7607 | 0.1991 | | |
| 10 | −99.6791 | 6.9616 | 1.6968 | 55.53 |
| 11 | −23.7129 | 1.1991 | 1.8467 | 23.78 |
| 12 | 56.2554 | 8.8700 | | |
| 13(Aperture) | ∞ | D13 | | |
| 14 | 51.2680 | 6.1446 | 1.7130 | 53.87 |
| 15 | −46.4335 | D15 | | |
| 16 | 38.9667 | 10.4404 | 1.5814 | 40.75 |
| 17 | −24.0084 | 2.5079 | 1.8348 | 42.71 |
| 18 | 28.9282 | D18 | | |
| 19 | −26.3492 | 1.5491 | 1.6516 | 58.55 |
| 20 | −187.9535 | 0.5448 | | |
| 21 | −120.8037 | 7.2796 | 1.8467 | 23.78 |
| 22 | −30.7965 | 12.5899 | | |
| 23* | −12.2997 | 6.4616 | 1.4910 | 57.58 |
| 24* | −11.5851 | 15.7858 | | |
| 25* | −18.0867 | 5.9994 | 1.4910 | 57.58 |
| 26* | −383.0006 | 53.0010 | | |
| 27* | 108.6321 | D27 | (Reflection Surface) | |

Varied Air Space

| | | | |
|---|---|---|---|
| D13 | 8.7676 | 9.0293 | 9.4715 |
| D15 | 3.8211 | 3.7936 | 3.7452 |
| D18 | 11.0395 | 10.8054 | 10.4115 |
| D27 | −490.0000 | −573.0000 | −818.5000 |

*Aspherical

TABLE 3B

Example 3
Aspherical Surface Coefficient

| Symbol | 5* | 6* | 23* | 24* | 25* | 26* | 27* |
|---|---|---|---|---|---|---|---|
| K | −1.91527E+05 | 3.51731E+01 | 2.07892E−01 | 1.50141E−01 | −3.38000E+00 | −2.11564E+19 | 7.15716E−01 |
| A3 | 8.51333E−05 | 3.35077E−05 | −2.18512E−04 | −3.01729E−04 | −9.76793E−04 | −7.29692E−04 | −1.93331E−05 |
| A4 | −3.09124E−06 | 1.01727E−05 | 2.05199E−05 | 5.85251E−05 | −1.94797E−05 | −2.69126E−05 | −1.61655E−07 |
| A5 | 1.18847E−07 | 1.92291E−07 | 1.82517E−06 | −7.24820E−07 | 1.01355E−07 | 1.60547E−06 | 5.84202E−08 |
| A6 | 1.15797E−08 | 3.41993E−09 | −2.61242E−08 | −1.20775E−09 | −3.65208E−09 | −2.45364E−08 | −2.39382E−09 |
| A7 | −4.30500E−10 | −2.01323E−10 | −2.60321E−09 | 9.99964E−10 | −2.23763E−10 | −4.80158E−10 | 1.80996E−11 |
| A8 | −4.21111E−11 | −1.89262E−11 | −4.03365E−11 | 1.69961E−11 | −3.20825E−12 | 6.45159E−13 | 7.78011E−13 |
| A9 | −1.36160E−12 | −1.12284E−12 | 4.96907E−12 | −2.13168E−13 | 1.56982E−13 | 2.61076E−13 | −1.83665E−14 |
| A10 | −2.89907E−15 | −1.56911E−13 | 2.38143E−13 | −2.29076E−14 | 1.09956E−14 | 7.42843E−15 | 1.03035E−16 |
| A11 | 2.30887E−15 | −2.81306E−15 | 2.22161E−15 | −4.39048E−16 | 5.38131E−16 | 2.79067E−18 | 1.83954E−19 |
| A12 | 4.69213E−17 | 3.02434E−16 | −7.25327E−16 | 1.51720E−17 | 1.91984E−17 | −2.17897E−18 | 1.38240E−20 |
| A13 | 3.58382E−18 | 7.74963E−18 | 3.00651E−18 | −9.77451E−19 | 5.09907E−19 | −1.26037E−19 | −2.34472E−22 |
| A14 | 6.02563E−20 | 4.99275E−19 | 1.45206E−19 | −2.51941E−20 | 9.77583E−21 | −2.05555E−21 | −5.22665E−25 |
| A15 | −2.72639E−21 | 1.24487E−20 | −9.70622E−22 | −3.01380E−22 | −9.66262E−23 | −1.02277E−23 | 4.19007E−27 |
| A16 | −3.53207E−22 | −2.48936E−21 | −2.55161E−22 | 2.27477E−24 | −2.38915E−23 | 1.93401E−24 | 4.01787E−28 |
| A17 | | | 2.68879E−23 | 1.04507E−24 | −1.50468E−24 | 7.61656E−26 | −3.04993E−30 |
| A18 | | | −1.58884E−24 | 4.72810E−26 | −9.06632E−26 | 1.78437E−27 | −2.49735E−32 |
| A19 | | | −4.19285E−27 | 1.36337E−27 | −4.26075E−27 | −3.18516E−29 | 3.50848E−34 |
| A20 | | | 3.95610E−27 | 3.42773E−29 | −1.94652E−28 | −4.87944E−30 | −1.06829E−36 |

Figure 4B:
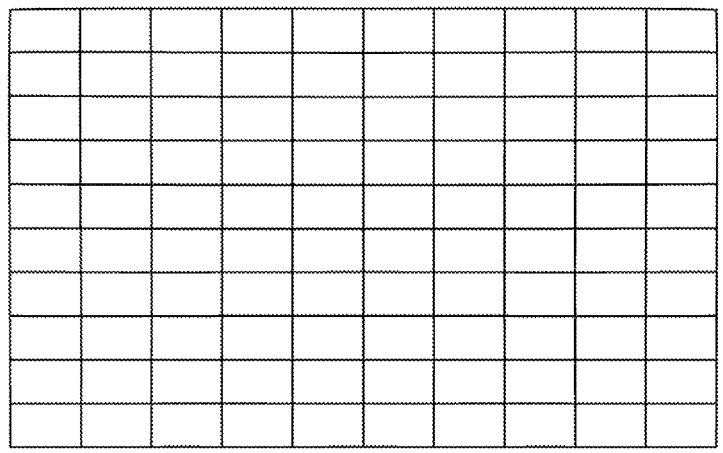
FIG. 4B illustrates distortion of the projection optical system of Example 3.
Figure 4C:
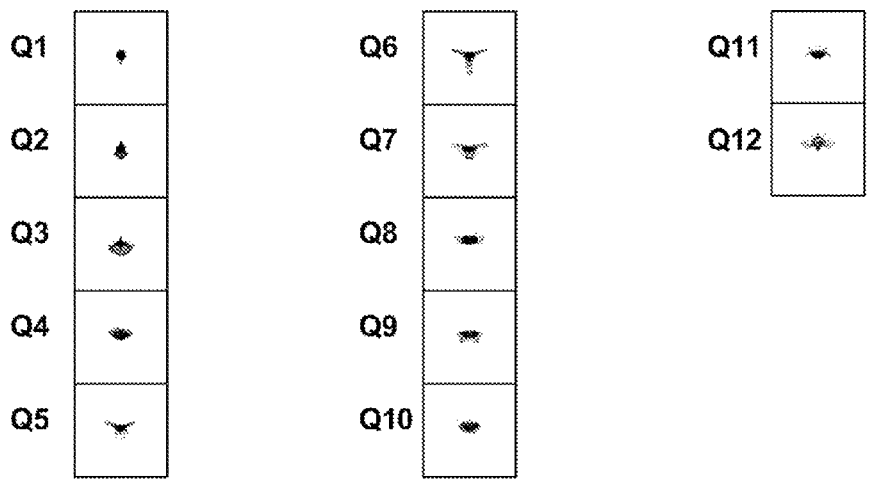
FIG. 4C illustrates spot diagrams of the projection optical system of Example 3.

FIGS. 4B, 4C illustrate distortion and spot diagrams of the projection optical system of Example 3 respectively.

As is clear from FIGS. 4A, 4B, 4C and Tables 3A, 3B, the projection optical system of Example 3 is a projection optical system capable of satisfactorily correcting various types of aberrations that occur at the time of focus adjustment.

Example 4

FIG. 5A is a cross-sectional view of a projection optical system of Example 4, illustrating the cross-section thereof.

The projection optical system of Example 4 also substantially consists of a first optical system K1 composed of four lens groups (first lens group G1 to fourth lens group G4) and a second optical system K2 which is an aspherical reflection mirror arranged in this order from the reduction side.

As illustrated in FIG. 5A, also in the first optical system K1 of Example 4, focus adjustment is performed by individually moving two lens groups (second lens group G2, third lens group G3) along a direction of the optical axis Z1 when the projection distance is changed. The first optical system K1 is composed of a first lens group G1 constituted by six lenses indicated by symbols L1, L2, l3, L4, L5, L6 in the drawing, a second lens group G2 constituted by one lens indicated by a symbol L7, a third lens group G3 constituted by two lenses indicated by symbols L8, L9, and a fourth lens group G4 constituted by four lenses indicated by symbols L10, L11, L12, L13 arranged in this order from the reduction side. Note that an aperture stop St is associated with the first lens group G1. The reduction side lens surface S3 of the lens L1 indicated by the symbol L1 corresponds to the surface number 3 and the reflection surface S27 of the second optical system K2 corresponds to the surface number 27 (refer to Table 4A).

Tables 4A, 4B that respectively indicate lens data and aspherical surface coefficients of the projection optical system of Example 4 are given below.

TABLE 4A

Example 4
Lens Data

| Surface No. | R | D | Nd | vd |
|---|---|---|---|---|
| 1 | ∞ | 32.0000 | 1.5163 | 64.14 |
| 2 | ∞ | 13.5785 | | |
| 3 | 39.8093 | 9.6007 | 1.8467 | 23.78 |
| 4 | −129.9773 | 0.1998 | | |
| 5* | 359.3582 | 3.4135 | 1.4910 | 57.58 |
| 6* | 135.1747 | 0.1991 | | |
| 7 | 25.9518 | 1.9075 | 1.7400 | 28.30 |
| 8 | 17.5154 | 13.9539 | 1.4970 | 81.54 |
| 9 | −39.2692 | 0.1990 | | |
| 10 | −66.4654 | 7.4407 | 1.6779 | 55.34 |
| 11 | −15.6767 | 1.1991 | 1.8467 | 23.78 |
| 12 | 38.0214 | 4.9400 | | |
| 13(Aperture) | ∞ | D13 | | |
| 14 | 58.4974 | 5.8193 | 1.7205 | 34.71 |
| 15 | −29.8304 | D15 | | |
| 16 | 34.0192 | 8.9406 | 1.5955 | 39.24 |
| 17 | −19.5683 | 1.1991 | 1.8000 | 29.84 |
| 18 | 28.0561 | D18 | | |
| 19 | −20.5460 | 1.4991 | 1.6228 | 57.05 |
| 20 | 17428.2435 | 1.5654 | | |
| 21 | −100.0262 | 9.9608 | 1.8467 | 23.78 |
| 22 | −23.7340 | 7.2801 | | |
| 23* | −12.1728 | 9.4285 | 1.4910 | 57.58 |
| 24* | −11.3306 | 9.8323 | | |
| 25* | −16.7083 | 6.7022 | 1.4910 | 57.58 |
| 26* | −326.7186 | 78.1271 | | |
| 27* | 103.4501 | D27 | (Reflection Surface) | |

Varied Air Space

| | | | |
|---|---|---|---|
| D13 | 6.3281 | 6.5216 | 6.8308 |
| D15 | 0.6053 | 0.5654 | 0.4977 |
| D18 | 10.7781 | 10.6244 | 10.3829 |
| D27 | −490.0000 | −573.0000 | −818.5000 |

*Aspherical

TABLE 4B

Example 4
Aspherical Surface Coefficient

| Symbol | 5* | 6* | 23* | 24* | 25* | 26* | 27* |
|---|---|---|---|---|---|---|---|
| K | −1.25146E+04 | 5.42225E+01 | 2.68296E−01 | 1.50107E−01 | −2.98459E+00 | −2.11564E+19 | 7.28738E−01 |
| A3 | 1.57500E−04 | 1.33981E−05 | −1.23356E−04 | −1.98635E−04 | −7.84881E−04 | −6.15017E−04 | −2.79075E−05 |
| A4 | −2.72972E−06 | 1.48431E−05 | 1.46532E−05 | 6.73802E−05 | −1.22326E−05 | −2.59019E−05 | −8.83800E−08 |
| A5 | 2.43007E−07 | 3.91515E−07 | 1.93289E−06 | −7.62731E−07 | 5.08375E−07 | 1.75194E−06 | 5.89582E−08 |
| A6 | 1.76324E−08 | 7.08162E−09 | −1.27629E−08 | −6.56215E−09 | 1.11203E−08 | −2.18107E−08 | −2.39716E−09 |
| A7 | −4.19159E−10 | −3.37182E−10 | −2.37989E−09 | 8.70989E−10 | 1.37073E−10 | −4.51687E−10 | 1.80556E−11 |
| A8 | −5.65819E−11 | −3.45886E−11 | −5.04841E−11 | 1.65041E−11 | 2.02383E−12 | 5.39371E−13 | 7.77753E−13 |
| A9 | −2.28301E−12 | −2.11274E−12 | 4.20205E−12 | −1.08637E−13 | 6.45811E−14 | 2.34711E−13 | −1.83674E−14 |
| A10 | −3.61938E−14 | −1.85350E−13 | 2.15067E−13 | −1.62143E−14 | 1.43029E−15 | 5.67884E−15 | 1.03049E−16 |
| A11 | 1.87597E−15 | −3.67777E−15 | 1.88775E−15 | −1.20999E−16 | 6.18624E−17 | 2.27233E−17 | 1.84118E−19 |
| A12 | 7.83954E−17 | 3.23440E−16 | −7.13399E−16 | 2.82086E−17 | −2.11004E−19 | −1.72776E−18 | 1.38256E−20 |
| A13 | 6.59213E−18 | 8.67859E−18 | 4.49096E−18 | −5.12574E−19 | −4.41489E−20 | −8.91949E−20 | −2.34461E−22 |
| A14 | 2.53559E−19 | 4.24231E−19 | 2.21599E−19 | −9.84277E−21 | −2.94747E−21 | −2.23932E−21 | −5.22642E−25 |
| A15 | −2.96218E−21 | −5.95982E−21 | 2.98857E−21 | 1.32805E−22 | −1.01203E−22 | −2.74009E−23 | 4.18946E−27 |
| A16 | −1.01016E−21 | −3.94874E−21 | −4.99777E−23 | 9.99786E−24 | −3.51684E−24 | 5.79336E−25 | 4.01774E−28 |
| A17 | | | 3.76775E−23 | 9.72903E−25 | −8.82866E−26 | 4.76265E−26 | −3.05009E−30 |
| A18 | | | −1.04328E−24 | 2.92946E−26 | −1.22019E−27 | 1.46634E−27 | −2.49745E−32 |
| A19 | | | 1.85163E−26 | −1.85087E−28 | 3.67208E−29 | 1.82551E−29 | 3.50848E−34 |
| A20 | | | 4.85241E−27 | −5.31386E−29 | 5.56830E−30 | −1.27619E−30 | −1.06811E−36 |

FIGS. 5B, 5C illustrate distortion and spot diagrams of the projection optical system of Example 4 respectively.

As is clear from FIGS. 5A, 5B, 5C and Tables 4A, 4B, the projection optical system of Example 4 is a projection optical system capable of satisfactorily correcting various types of aberrations that occur at the time of focus adjustment.

Example 5

FIG. 6A is a cross-sectional view of a projection optical system of Example 5, illustrating the cross-section thereof.

The projection optical system of Example 5 also substantially consists of a first optical system K1 composed of four lens groups (first lens group G1 to fourth lens group G4) and a second optical system K2 which is an aspherical reflection mirror arranged in this order from the reduction side.

As illustrated in FIG. 6A, also in the first optical system K1 of Example 5, focus adjustment is performed by individually moving two lens groups (second lens group G2, third lens group G3) along a direction of the optical axis Z1 when the projection distance is changed.

The first optical system K1 is composed of a first lens group G1 constituted by six lenses indicated by symbols L1, L2, l3, L4, L5, L6 in the drawing, a second lens group G2 constituted by one lens indicated by a symbol L7, a third lens group G3 constituted by two lenses indicated by symbols L8, L9, and a fourth lens group G4 constituted by four lenses indicated by symbols L10, L11, L12, L13 arranged in this order from the reduction side. Note that an aperture stop St is associated with the first lens group G1. The reduction side lens surface S3 of the lens L1 indicated by the symbol L1 corresponds to the surface number 3 and the reflection surface S27 of the second optical system K2 corresponds to the surface number 27 (refer to Table 5A).

Tables 5A, 5B that respectively indicate lens data and aspherical surface coefficients of the projection optical system of Example 5 are given below.

TABLE 5A

Example 5

Lens Data

| Surface No. | R | D | Nd | νd |
|---|---|---|---|---|
| 1 | ∞ | 32.0000 | 1.5163 | 64.14 |
| 2 | ∞ | 13.5595 | | |
| 3 | 52.6579 | 3.5810 | 1.4910 | 57.58 |
| 4 | 152.6449 | 0.3991 | | |
| 5* | 44.4852 | 9.8412 | 1.8052 | 25.42 |
| 6* | −83.4159 | 9.1149 | | |
| 7 | 66.5065 | 1.4490 | 1.6990 | 30.13 |
| 8 | 15.7948 | 13.0336 | 1.4970 | 81.54 |
| 9 | −31.2978 | 0.1991 | | |
| 10 | −36.8845 | 6.7959 | 1.6516 | 58.55 |
| 11 | −16.8569 | 1.2090 | 1.8052 | 25.42 |
| 12 | 248.3517 | 2.0700 | | |
| 13(Aperture) | ∞ | D13 | | |
| 14 | 41.8352 | 5.3561 | 1.6935 | 53.21 |
| 15 | −33.1071 | D15 | | |
| 16 | 28.9497 | 7.1785 | 1.5814 | 40.75 |
| 17 | −21.3754 | 1.1990 | 1.8040 | 46.57 |
| 18 | 19.6341 | D18 | | |
| 19 | −15.4877 | 1.6871 | 1.4875 | 70.23 |
| 20 | −671.8167 | 2.9162 | | |
| 21 | −56.1709 | 9.7093 | 1.8052 | 25.42 |
| 22 | −22.8972 | 15.3018 | | |
| 23* | −14.2645 | 6.0911 | 1.4910 | 57.58 |
| 24* | −11.6140 | 13.5425 | | |
| 25* | −18.6795 | 5.9991 | 1.4910 | 57.58 |
| 26* | −342.4126 | 70.1713 | | |
| 27* | 100.2827 | D27 | (Reflection Surface) | |

Varied Air Space

| D13 | 2.41056 | 2.51578 | 2.69575 |
|---|---|---|---|
| D15 | 0.528322 | 0.516886 | 0.495855 |
| D18 | 11.2859 | 11.1921 | 11.0332 |
| D27 | −490.0000 | −573.0000 | −818.5000 |

*Aspherical

TABLE 5B

Example 5
Aspherical Surface Coefficient

| Symbol | 5* | 6* | 23* | 24* | 25* | 26* | 27* |
|---|---|---|---|---|---|---|---|
| K | −9.56808E+00 | 4.76282E+01 | 2.66919E−01 | 1.43874E−01 | −3.94057E+00 | −2.11564E+19 | 7.46827E−01 |
| A3 | 3.90948E−05 | 7.06165E−06 | −1.53333E−04 | −2.90437E−04 | −9.63204E−04 | −7.26660E−04 | −2.38685E−05 |
| A4 | 1.25005E−06 | 6.14432E−06 | 1.25241E−05 | 5.81555E−05 | −1.84799E−05 | −2.68005E−05 | −1.58240E−07 |
| A5 | 6.20555E−08 | 8.62020E−08 | 1.44796E−06 | −8.60650E−07 | 3.81619E−07 | 1.69085E−06 | 5.85827E−08 |
| A6 | 1.69303E−08 | 4.39300E−09 | −1.59695E−08 | −8.15486E−09 | 9.58265E−09 | −2.15638E−08 | −2.39438E−09 |
| A7 | 9.42760E−11 | 3.82268E−10 | −2.03102E−09 | 9.79408E−10 | 1.47866E−10 | −4.59506E−10 | 1.80843E−11 |
| A8 | −1.35851E−11 | 2.50732E−11 | −3.62392E−11 | 1.87929E−11 | 3.69046E−12 | 1.20724E−12 | 7.77866E−13 |
| A9 | −2.11578E−13 | 7.94808E−13 | 4.36474E−12 | −6.82753E−14 | 1.25216E−13 | 2.39249E−13 | −1.83677E−14 |
| A10 | 1.57525E−14 | −9.60959E−14 | 2.00642E−13 | −1.41864E−14 | 3.55253E−15 | 6.17326E−15 | 1.03032E−16 |
| A11 | 1.58103E−15 | −3.33408E−15 | 1.00380E−15 | −1.75609E−16 | 1.06704E−16 | 2.43755E−17 | 1.83965E−19 |
| A12 | −6.44119E−17 | 1.47626E−16 | −7.27707E−16 | 2.38843E−17 | 8.14116E−19 | −1.55639E−18 | 1.38245E−20 |
| A13 | −3.26717E−18 | −4.17513E−18 | 3.60076E−18 | −7.50980E−19 | −4.48315E−20 | −7.75650E−20 | −2.34466E−22 |
| A14 | −1.45701E−19 | −4.75590E−20 | 2.68523E−19 | −2.16079E−20 | −3.57080E−21 | −2.41892E−21 | −5.22623E−25 |
| A15 | −5.11427E−21 | 6.94274E−21 | 4.97273E−21 | −2.06221E−22 | −1.48480E−22 | −3.66469E−23 | 4.19015E−27 |
| A16 | 4.96215E−22 | −1.92333E−22 | 1.24159E−23 | −3.51584E−24 | −5.33388E−24 | 2.50164E−25 | 4.01783E−28 |
| A17 | | | 3.96067E−23 | 6.69076E−25 | −1.32826E−25 | 3.91468E−26 | −3.05000E−30 |
| A18 | | | −1.58537E−24 | 2.94471E−26 | −2.94367E−27 | 1.28850E−27 | −2.49743E−32 |
| A19 | | | −3.15539E−26 | −3.14140E−29 | 2.48690E−29 | 2.14227E−29 | 3.50844E−34 |
| A20 | | | 1.41141E−27 | −3.65346E−29 | 6.41362E−30 | −1.05354E−30 | −1.06822E−36 |

FIGS. 6B, 6C illustrate distortion and spot diagrams of the projection optical system of Example 5 respectively.

As is clear from FIGS. 6A, 6B, 6C and Tables 5A, 5B, the projection optical system of Example 5 is a projection optical system capable of satisfactorily correcting various types of aberrations that occur at the time of focus adjustment.

Example 6

FIG. 7A is a cross-sectional view of a projection optical system of Example 6, illustrating the cross-section thereof.

The projection optical system of Example 6 also substantially consists of a first optical system K1 composed of four lens groups (first lens group G1 to fourth lens group G4) and a second optical system K2 which is an aspherical reflection mirror arranged in this order from the reduction side.

As illustrated in FIG. 7A, also in the first optical system K1 of Example 6, focus adjustment is performed by individually moving two lens groups (second lens group G2, third lens group G3) along a direction of the optical axis Z1 when the projection distance is changed.

The first optical system K1 is composed of a first lens group G1 constituted by five lenses indicated by symbols L1, L2, l3, L4, L5 in the drawing, a second lens group G2 constituted by one lens indicated by a symbol L6, a third lens group G3 constituted by two lenses indicated by symbols L7, L8, and a fourth lens group G4 constituted by four lenses indicated by symbols L9, L10, L11, L12 arranged in this order from the reduction side. The reduction side lens surface S3 of the lens L1 indicated by the symbol L1 corresponds to the surface number 3 and the reflection surface S24 of the second optical system K2 corresponds to the surface number 24 (refer to Table 6A).

Tables 6A, 6B that respectively indicate lens data and aspherical surface coefficients of the projection optical system of Example 6 are given below.

TABLE 6A

Example 6

Lens Data

| Surface No. | R | D | Nd | vd |
|---|---|---|---|---|
| 1 | ∞ | 32.0000 | 1.5163 | 64.14 |
| 2 | ∞ | 13.5608 | | |
| 3* | 38.4967 | 4.5690 | 1.4910 | 57.58 |
| 4* | 158.6400 | 0.9241 | | |
| 5 | 56.3931 | 8.5532 | 1.8467 | 23.78 |
| 6 | −92.7543 | 11.6533 | | |
| 7 | 116.3774 | 1.4491 | 1.6990 | 30.13 |
| 8 | 14.5867 | 20.0193 | 1.4970 | 81.54 |
| 9 | −19.8118 | 3.0009 | 1.8467 | 23.78 |
| 10 | −60.8004 | D10 | | |
| 11 | 57.9425 | 5.5041 | 1.6516 | 58.55 |
| 12 | −31.1542 | D12 | | |
| 13 | 49.9186 | 8.6529 | 1.5174 | 52.43 |
| 14 | −18.9797 | 1.1991 | 1.7292 | 54.68 |
| 15 | 23.1321 | D15 | | |
| 16 | −16.2427 | 1.5490 | 1.5163 | 64.14 |
| 17 | −155.0553 | 2.8971 | | |
| 18 | −48.9817 | 10.3669 | 1.8467 | 23.78 |
| 19 | −23.3418 | 13.8790 | | |
| 20* | −15.9596 | 5.9991 | 1.4910 | 57.58 |
| 21* | −12.3006 | 13.0980 | | |
| 22* | −18.3249 | 6.0010 | 1.4910 | 57.58 |
| 23* | −341.9830 | 65.3437 | | |
| 24* | 98.7574 | D24 | (Reflection Surface) | |

Varied Air Space

| D10 | 1.41544 | 1.50 | 1.63564 |
|---|---|---|---|
| D12 | 3.86794 | 3.86 | 3.85063 |
| D15 | 11.072 | 11.00 | 10.8691 |
| D24 | −490.0000 | −573.0000 | −818.5000 |

TABLE 6B

Example 6
Aspherical Surface Coefficient

| Symbol | 3* | 4* | 20* | 21* | 22* | 23* | 24* |
|---|---|---|---|---|---|---|---|
| K | −2.62839E+00 | 5.07723E+01 | 2.80253E−01 | 1.42364E−01 | −3.50292E+00 | −2.11604E+19 | 7.40790E−01 |
| A3 | 1.77611E−05 | −8.99366E−06 | −9.48437E−05 | −2.72545E−04 | −9.88956E−04 | −7.45320E−04 | −2.33569E−05 |
| A4 | 1.78884E−06 | 7.98760E−06 | 1.69929E−06 | 5.48450E−05 | −1.84504E−05 | −2.68580E−05 | −1.88736E−07 |
| A5 | 7.40868E−08 | 1.13829E−08 | 1.46859E−06 | −9.75906E−07 | 3.51414E−07 | 1.72187E−06 | 5.86642E−08 |
| A6 | 1.21841E−08 | −5.72237E−10 | −1.45890E−08 | −9.72690E−09 | 8.70143E−09 | −2.29617E−08 | −2.39278E−09 |
| A7 | −1.18847E−10 | 1.25040E−10 | −2.11261E−09 | 9.73849E−10 | 1.44785E−10 | −4.58313E−10 | 1.80773E−11 |
| A8 | −2.05767E−11 | 1.38754E−11 | −4.03669E−11 | 1.99617E−11 | 4.41458E−12 | 8.68166E−13 | 7.77816E−13 |
| A9 | −2.77853E−13 | 5.63368E−13 | 4.22134E−12 | −2.77845E−15 | 1.49656E−13 | 2.48711E−13 | −1.83678E−14 |
| A10 | 2.17709E−14 | −8.94520E−14 | 1.98080E−13 | −1.26211E−14 | 4.57177E−15 | 6.35878E−15 | 1.03031E−16 |
| A11 | 2.22542E−15 | −2.21825E−15 | 1.09225E−15 | −1.31012E−16 | 1.29454E−16 | 2.36782E−17 | 1.83970E−19 |
| A12 | −2.26347E−17 | 2.09197E−16 | −7.40909E−16 | 2.60641E−17 | 1.61652E−18 | −1.69279E−18 | 1.38246E−20 |
| A13 | −1.40675E−18 | −1.74140E−18 | 3.32354E−18 | −7.88331E−19 | −3.36853E−20 | −8.39253E−20 | −2.34465E−22 |
| A14 | −8.00125E−20 | 4.61192E−21 | 2.77477E−19 | −2.31007E−20 | −3.12858E−21 | −2.53971E−21 | −5.22617E−25 |
| A15 | −5.76402E−21 | 4.57192E−21 | 4.14825E−21 | −1.21831E−22 | −1.49102E−22 | −3.66456E−23 | 4.19016E−27 |
| A16 | 1.99536E−22 | −4.89730E−22 | −1.48750E−23 | −9.06151E−24 | −5.33971E−24 | 2.30476E−25 | 4.01783E−28 |
| A17 | | | 4.19762E−23 | 6.51832E−25 | −1.21704E−25 | 4.11513E−26 | −3.05001E−30 |
| A18 | | | −1.60418E−24 | 2.43227E−26 | −3.46836E−27 | 1.27225E−27 | −2.49743E−32 |
| A19 | | | −3.25077E−26 | 1.28714E−28 | 1.01540E−29 | 1.92009E−29 | 3.50843E−34 |
| A20 | | | 1.34518E−27 | −2.66733E−29 | 4.74815E−30 | −1.17069E−30 | −1.06822E−36 |

FIGS. 7B, 7C illustrate distortion and spot diagrams of the projection optical system of Example 6 respectively.

As is clear from FIGS. 7A, 7B, 7C and Tables 6A, 6B, the projection optical system of Example 6 is a projection optical system capable of satisfactorily correcting various types of aberrations that occur at the time of focus adjustment.

Example 7

FIG. 8A is a cross-sectional view of a projection optical system of Example 7, illustrating the cross-section thereof.

The projection optical system of Example 7 also substantially consists of a first optical system K1 composed of four lens groups (first lens group G1 to fourth lens group G4) and a second optical system K2 which is an aspherical reflection mirror arranged in this order from the reduction side.

As illustrated in FIG. 8A, also in the first optical system K1 of Example 7, focus adjustment is performed by individually moving two lens groups (second lens group G2, third lens group G3) along a direction of the optical axis Z1 when the projection distance is changed.

The first optical system K1 is composed of a first lens group G1 constituted by five lenses indicated by symbols L1, L2, l3, L4, L5 in the drawing, a second lens group G2 constituted by one lens indicated by a symbol L6, a third lens group G3 constituted by two lenses indicated by symbols L7, L8, and a fourth lens group G4 constituted by four lenses indicated by symbols L9, L10, L11, L12 arranged in this order from the reduction side. The reduction side lens surface S3 of the lens L1 indicated by the symbol L1 corresponds to the surface number 3 and the reflection surface S24 of the second optical system K2 corresponds to the surface number 24 (refer to Table 7A).

Tables 7A, 7B that respectively indicate lens data and aspherical surface coefficients of the projection optical system of Example 7 are given below.

TABLE 7A

Example 7

Lens Data

| Surface No. | R | D | Nd | vd |
|---|---|---|---|---|
| 1 | ∞ | 32.0000 | 1.5163 | 64.14 |
| 2 | ∞ | 13.5599 | | |
| 3 | 40.7742 | 8.6108 | 1.8467 | 23.78 |
| 4 | −277.0101 | 0.4003 | | |
| 5* | 28.3787 | 9.0977 | 1.4910 | 57.58 |
| 6* | −539.2913 | 5.3516 | | |
| 7 | −92.5178 | 1.4491 | 1.6990 | 30.13 |
| 8 | 13.1029 | 20.0209 | 1.4970 | 81.54 |
| 9 | −15.0323 | 3.0010 | 1.7552 | 27.51 |
| 10 | −43.7605 | D10 | | |
| 11 | 80.6508 | 5.6893 | 1.6779 | 55.34 |
| 12 | −27.6990 | D12 | | |
| 13 | 40.5991 | 9.4136 | 1.5174 | 52.43 |
| 14 | −18.8096 | 1.1991 | 1.7292 | 54.68 |
| 15 | 23.0212 | D15 | | |
| 16 | −18.0561 | 1.5491 | 1.5638 | 60.67 |
| 17 | −225.0269 | 2.5208 | | |
| 18 | −54.4607 | 10.0605 | 1.8467 | 23.78 |
| 19 | −23.8224 | 14.2462 | | |
| 20* | −13.7430 | 6.2062 | 1.4910 | 57.58 |
| 21* | −11.4787 | 13.7577 | | |
| 22* | −18.4986 | 5.9990 | 1.4910 | 57.58 |
| 23* | −330.6966 | 67.7378 | | |
| 24* | 101.6137 | D24 | (Reflection Surface) | |

Varied Air Space

| D10 | 2.24229 | 2.31 | 2.43677 |
|---|---|---|---|
| D12 | 1.33223 | 1.32 | 1.31064 |
| D15 | 11.1372 | 11.07 | 10.9643 |
| D24 | −490.0000 | −573.0000 | −818.5000 |

Figure 8B:
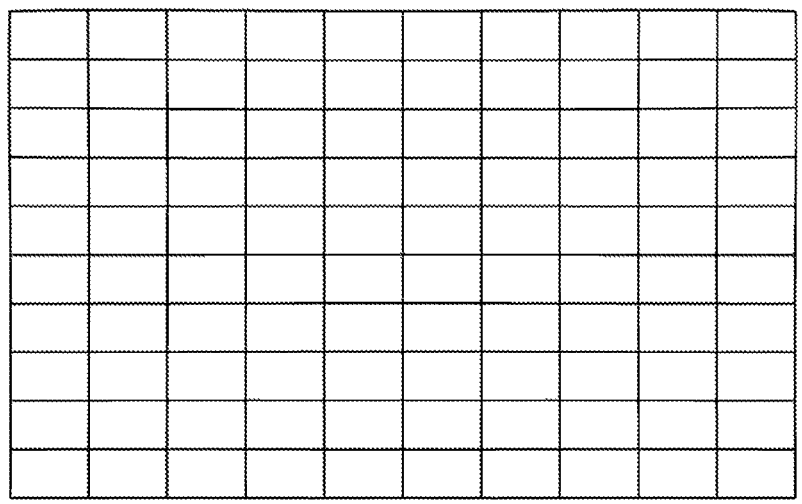
FIG. 8B illustrates distortion of the projection optical system of Example 7.
Figure 8C:
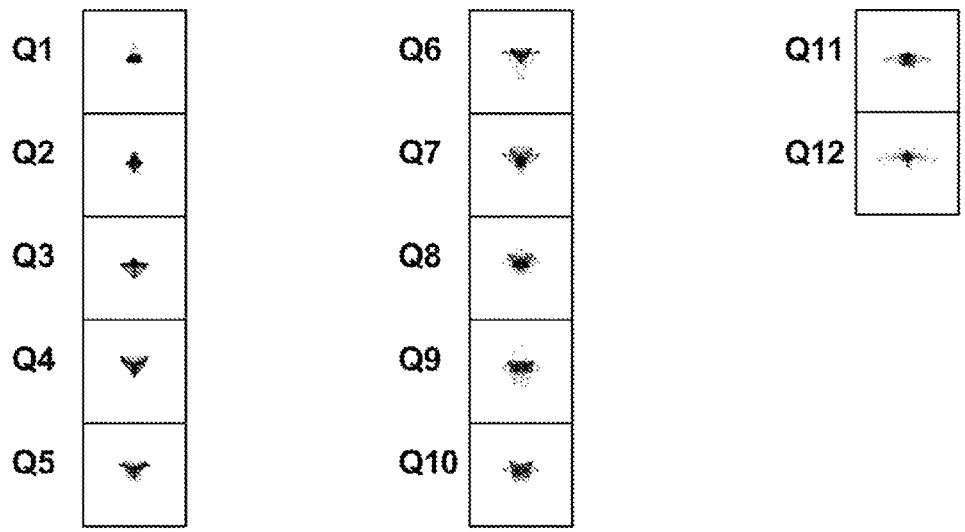
FIG. 8C illustrates spot diagrams of the projection optical system of Example 7.

FIGS. 8B, 8C illustrate distortion and spot diagrams of the projection optical system of Example 7 respectively.

As is clear from FIGS. 8A, 8B, 8C and Tables 7A, 7B, the projection optical system of Example 7 is a projection optical system capable of satisfactorily correcting various types of aberrations that occur at the time of focus adjustment.

Example 8

FIG. 9A is a cross-sectional view of a projection optical system of Example 8, illustrating the cross-section thereof.

The projection optical system of Example 8 also substantially consists of a first optical system K1 composed of four lens groups (first lens group G1 to fourth lens group G4) and a second optical system K2 which is an aspherical reflection mirror arranged in this order from the reduction side.

As illustrated in FIG. 9A, also in the first optical system K1 of Example 8, focus adjustment is performed by individually moving two lens groups (second lens group G2, third lens group G3) along a direction of the optical axis Z1 when the projection distance is changed.

The first optical system K1 is composed of a first lens group G1 constituted by six lenses indicated by symbols L1, L2, l3, L4, L5, L6 in the drawing, a second lens group G2 constituted by one lens indicated by a symbol L7, a third lens group G3 constituted by four lenses indicated by symbols L8, L9, L10, L11 and a fourth lens group G4 constituted by two lenses indicated by symbols L12, L13 arranged in this order from the reduction side. Note that an aperture stop St is associated with the first lens group G1. The reduction side lens surface S3 of the lens L1 indicated by the symbol L1 corresponds to the surface number 3 and the reflection surface S26 of the second optical system K2 corresponds to the surface number 26 (refer to Table 8A).

Tables 8A, 8B that respectively indicate lens data and aspherical surface coefficients of the projection optical system of Example 8 are given below.

TABLE 7B

Example 7
Aspherical Surface Coefficient

| | Surface No. | | | | | | |
|---|---|---|---|---|---|---|---|
| Symbol | 5* | 6* | 20* | 21* | 22* | 23* | 24* |
| K | −7.79413E−01 | −5.18320E+03 | 2.76751E−01 | 1.42896E−01 | −3.75815E+00 | −2.11606E+19 | 7.35448E−01 |
| A3 | 2.31397E−05 | −1.46476E−05 | −5.94790E−05 | −2.30798E−04 | −9.83063E−04 | −7.74939E−04 | −2.21180E−05 |
| A4 | 2.27349E−06 | 9.89808E−06 | 9.17500E−06 | 5.65733E−05 | −2.09098E−05 | −2.57962E−05 | −1.81546E−07 |
| A5 | 2.66966E−07 | −7.99591E−08 | 1.46278E−06 | −1.00689E−06 | 2.99980E−07 | 1.68000E−06 | 5.87594E−08 |
| A6 | 1.55985E−09 | −2.75954E−09 | −1.75872E−08 | −9.20252E−09 | 8.38673E−09 | −2.25859E−08 | −2.39240E−09 |
| A7 | −5.46519E−10 | −2.18569E−10 | −1.96068E−09 | 9.94458E−10 | 1.64644E−10 | −4.74089E−10 | 1.80719E−11 |
| A8 | −1.64336E−11 | −4.95932E−12 | −3.01968E−11 | 1.99825E−11 | 5.25237E−12 | 1.63767E−12 | 7.77762E−13 |
| A9 | 4.13038E−13 | −3.10845E−13 | 4.58766E−12 | −5.15630E−15 | 1.72678E−13 | 2.59523E−13 | −1.83676E−14 |
| A10 | 2.91155E−14 | −1.33305E−13 | 2.05953E−13 | −1.25381E−14 | 5.14792E−15 | 6.54583E−15 | 1.03032E−16 |
| A11 | 5.34137E−16 | −4.25229E−15 | 1.19731E−15 | −1.11446E−16 | 1.40476E−16 | 2.56032E−17 | 1.84024E−19 |
| A12 | −1.64473E−16 | −1.16300E−17 | −7.44207E−16 | 2.75303E−17 | 1.74628E−18 | −1.70713E−18 | 1.38250E−20 |
| A13 | −6.19201E−18 | −1.57642E−17 | 3.22841E−18 | −7.26796E−19 | −3.52188E−20 | −8.45853E−20 | −2.34462E−22 |
| A14 | −1.14442E−19 | −6.26731E−19 | 2.74021E−19 | −2.02766E−20 | −3.45601E−21 | −2.58075E−21 | −5.22612E−25 |
| A15 | −6.52551E−21 | 2.38661E−21 | 4.44416E−21 | −6.45205E−23 | −1.62113E−22 | −3.70298E−23 | 4.19003E−27 |
| A16 | −1.80175E−21 | 3.59684E−21 | 2.85901E−24 | −5.99576E−24 | −5.82212E−24 | 2.32836E−25 | 4.01781E−28 |
| A17 | | | 4.33966E−23 | 7.33482E−25 | −1.33462E−25 | 4.21565E−26 | −3.05003E−30 |
| A18 | | | −1.54781E−24 | 2.49076E−26 | −3.71857E−27 | 1.32232E−27 | −2.49745E−32 |
| A19 | | | −3.04687E−26 | 6.08107E−29 | 1.67066E−29 | 2.13272E−29 | 3.50846E−34 |
| A20 | | | 1.39342E−27 | −3.45919E−29 | 5.43529E−30 | −1.07394E−30 | −1.06818E−36 |

TABLE 8A

Example 8

Lens Data

| Surface No. | R | D | Nd | νd |
|---|---|---|---|---|
| 1 | ∞ | 32.0000 | 1.5163 | 64.14 |
| 2 | ∞ | 13.5516 | | |
| 3 | 37.5654 | 9.6529 | 1.8052 | 25.42 |
| 4 | −140.9009 | 0.2997 | | |
| 5* | 94.0477 | 3.4990 | 1.4910 | 57.58 |
| 6* | 157.2247 | 0.2991 | | |
| 7 | 48.2456 | 1.4990 | 1.6668 | 33.05 |
| 8 | 17.7227 | 13.6953 | 1.4970 | 81.54 |
| 9 | −42.6431 | 0.1991 | | |
| 10 | −173.3843 | 7.9532 | 1.6516 | 58.55 |
| 11 | −17.1330 | 1.2491 | 1.7552 | 27.51 |
| 12 | 46.4624 | 7.1800 | | |
| 13(Aperture) | ∞ | D13 | | |
| 14 | 50.2323 | 6.2340 | 1.6516 | 58.55 |
| 15 | −35.7367 | D15 | | |
| 16 | 45.8301 | 8.7606 | 1.5174 | 52.43 |
| 17 | −20.1168 | 1.3991 | 1.6935 | 50.81 |
| 18 | 25.7270 | 8.9218 | | |
| 19 | −17.5715 | 1.6090 | 1.5638 | 60.67 |
| 20 | −120.3698 | 7.8529 | 1.8052 | 25.42 |
| 21 | −25.6878 | D21 | | |
| 22* | −12.5629 | 7.9994 | 1.4910 | 57.58 |
| 23* | −11.7019 | 15.6597 | | |
| 24* | −18.3154 | 5.9991 | 1.4910 | 57.58 |
| 25* | −281.7641 | 60.7054 | | |
| 26* | 110.6320 | D26 | (Reflection Surface) | |

Varied Air Space

| D13 | 6.5556 | 6.6403 | 7.0132 |
|---|---|---|---|
| D15 | 2.8441 | 2.8392 | 2.8238 |
| D21 | 14.0285 | 13.9487 | 13.5911 |
| D26 | −490.0000 | −532.0000 | −780.0000 |

TABLE 8B

Example 8
Aspherical Surface Coefficient

| | Surface No. | | | | | | |
|---|---|---|---|---|---|---|---|
| Symbol | 5* | 6* | 22* | 23* | 24* | 25* | 26* |
| K | −5.93784E+01 | 6.42290E+01 | 2.36651E−01 | 1.82771E−01 | −2.88635E+00 | −2.11564E+19 | 8.10964E−01 |
| A3 | −2.22508E−06 | −1.36196E−05 | −1.57248E−04 | −2.59491E−04 | −9.31912E−04 | −8.27410E−04 | −1.91571E−05 |
| A4 | 1.74870E−06 | 5.71872E−06 | 3.20068E−05 | 5.97679E−05 | −2.18141E−05 | −1.84343E−05 | −2.12253E−07 |
| A5 | −6.01991E−10 | 3.05717E−07 | 1.87526E−06 | −5.78478E−07 | 2.41939E−07 | 1.32476E−06 | 5.90314E−08 |
| A6 | −2.52906E−09 | −3.50369E−09 | −5.32173E−08 | 6.85354E−10 | 3.76617E−09 | −1.63321E−08 | −2.39126E−09 |
| A7 | −3.78066E−10 | −4.04763E−10 | −2.37259E−09 | 1.03168E−09 | −3.79921E−11 | −4.43158E−10 | 1.80928E−11 |
| A8 | −2.37970E−11 | −3.09209E−11 | 4.18043E−11 | 1.67370E−11 | −7.67634E−13 | −9.36738E−13 | 7.77677E−13 |
| A9 | −1.11444E−12 | −1.28664E−12 | 6.78067E−12 | −2.33491E−13 | 8.65412E−14 | 1.95601E−13 | −1.83695E−14 |
| A10 | −1.91942E−14 | −7.24375E−14 | 2.07871E−13 | −2.26097E−14 | 5.61794E−15 | 6.34753E−15 | 1.03021E−16 |
| A11 | 8.32393E−16 | −1.65024E−15 | −3.16955E−15 | −3.89743E−16 | 2.90174E−16 | 7.31842E−17 | 1.84014E−19 |
| A12 | 1.04058E−16 | 1.29577E−16 | −1.02858E−15 | 1.84334E−17 | 1.06625E−17 | −9.77887E−21 | 1.38262E−20 |
| A13 | | | −8.14525E−18 | −7.84520E−19 | 3.80007E−19 | −6.13164E−20 | −2.34445E−22 |
| A14 | | | −9.38617E−21 | −1.71792E−20 | 1.23794E−20 | −2.29286E−21 | −5.22507E−25 |
| A15 | | | 1.20147E−20 | −6.35368E−23 | 3.54750E−22 | −5.55040E−23 | 4.19083E−27 |
| A16 | | | 1.08441E−21 | 1.23249E−23 | 8.52364E−24 | −6.72635E−25 | 4.01776E−28 |
| A17 | | | 1.01320E−22 | 1.25447E−24 | 8.65942E−26 | 1.19005E−26 | −3.05019E−30 |
| A18 | | | 9.20911E−25 | 4.15341E−26 | −6.83541E−27 | 9.05228E−28 | −2.49765E−32 |
| A19 | | | −2.25974E−26 | 1.00576E−27 | −6.67089E−28 | 2.63818E−29 | 3.50836E−34 |
| A20 | | | −8.41955E−27 | −4.98190E−30 | −4.07045E−29 | 4.07650E−32 | −1.06791E−36 |

FIGS. 9B, 9C illustrate distortion and spot diagrams of the projection optical system of Example 8 respectively.

As is clear from FIGS. 9A, 9B, 9C and Tables 8A, 8B, the projection optical system of Example 8 is a projection optical system capable of satisfactorily correcting various types of aberrations that occur at the time of focus adjustment.

Example 9

FIG. 10A is a cross-sectional view of a projection optical system of Example 9, illustrating the cross-section thereof.

The projection optical system of Example 9 also substantially consists of a first optical system K1 composed of four lens groups (first lens group G1 to fourth lens group G4) and a second optical system K2 which is an aspherical reflection mirror arranged in this order from the reduction side.

As illustrated in FIG. 10A, also in the first optical system K1 of Example 9, focus adjustment is performed by individually moving two lens groups (second lens group G2, third lens group G3) along a direction of the optical axis Z1 when the projection distance is changed.

The first optical system K1 is composed of a first lens group G1 constituted by seven lenses indicated by symbols L1, L2, l3, L4, L5, L6, L7 in the drawing, a second lens group G2 constituted by one lens indicated by a symbol L8, a third lens group G3 constituted by four lenses indicated by symbols L9, L10, L11, L12, and a fourth lens group G4 constituted by three lenses indicated by symbols L13, L14, L15 arranged in this order from the reduction side. Note that an aperture stop St is associated with the first lens group G1. The reduction side lens surface S3 of the lens L1 indicated by the symbol L1 corresponds to the surface number 3 and the reflection surface S31 of the second optical system K2 corresponds to the surface number 31 (refer to Table 9A).

Tables 9A, 9B that respectively indicate lens data and aspherical surface coefficients of the projection optical system of Example 9 are given below.

TABLE 9A

Example 9
Lens Data

| Surface No. | R | D | Nd | vd |
|---|---|---|---|---|
| 1 | 0.0000 | 32.0000 | 1.5163 | 64.14 |
| 2 | 0.0000 | 13.5000 | | |
| 3 | 41.8011 | 8.1546 | 1.8467 | 23.78 |
| 4 | -315.6304 | 0.1991 | | |
| 5* | 98.9532 | 3.4990 | 1.4910 | 57.58 |
| 6* | 165.6896 | 0.1991 | | |
| 7 | 49.4702 | 5.6216 | 1.5891 | 61.14 |
| 8 | 248.8886 | 0.1991 | | |
| 9 | 171.5341 | 1.4992 | 1.5317 | 48.84 |
| 10 | 14.4547 | 13.6544 | 1.4970 | 81.54 |
| 11 | -35.5196 | 0.2007 | | |
| 12 | -39.9945 | 4.9397 | 1.6204 | 60.29 |
| 13 | -16.8467 | 1.1991 | 1.8052 | 25.42 |
| 14 | 55.4297 | 6.8800 | | |
| 15(Aperture) | 0.0000 | D13 | | |
| 16 | 46.7123 | 5.0173 | 1.6204 | 60.29 |
| 17 | -40.7118 | D15 | | |
| 18 | 38.4443 | 7.9447 | 1.6034 | 38.03 |
| 19 | -36.7916 | 1.6100 | 1.6031 | 60.64 |
| 20 | 37.9509 | 9.2824 | | |
| 21 | -16.7020 | 1.5990 | 1.5638 | 60.67 |
| 22 | 452.2060 | 3.1068 | | |
| 23 | -64.9384 | 9.5567 | 1.8052 | 25.42 |
| 24 | -24.6111 | D24 | | |
| 25* | -26.8179 | 5.4991 | 1.4910 | 57.58 |
| 26* | -13.0403 | 1.9990 | | |
| 27 | -30.7858 | 2.1992 | 1.8467 | 23.78 |
| 28 | -39.0709 | 6.1758 | | |
| 29* | -15.3056 | 5.9993 | 1.4910 | 57.58 |
| 30* | -501.1831 | 64.9990 | | |
| 31* | 104.1000 | D31 | (Reflection Surface) | |

Varied Air Space

| D13 | 0.6957 | 0.5298 | 0.2545 |
|---|---|---|---|
| D15 | 17.6339 | 18.0841 | 18.8331 |
| D24 | 6.4894 | 6.2052 | 5.7314 |
| D31 | -490.0000 | -573.0000 | -818.5000 |

TABLE 9B

Example 9
Aspherical Surface Coefficient

| | Surface No. | | | | | | |
|---|---|---|---|---|---|---|---|
| Symbol | 5* | 6* | 25* | 26* | 29* | 30* | 31* |
| K | -7.72301E+01 | 7.30539E+01 | 1.46394E+00 | 2.25376E-01 | -2.21573E+00 | -2.40771E+34 | 7.91272E-01 |
| A3 | 9.28004E-05 | 7.64500E-05 | -7.00190E-05 | -2.09402E-04 | -3.32639E-04 | -2.36245E-04 | -1.39863E-05 |
| A4 | 1.31923E-05 | 1.34748E-05 | -4.04585E-05 | 5.10111E-05 | -1.11117E-05 | -3.26424E-05 | -1.56684E-07 |
| A5 | 3.03335E-07 | 5.15957E-07 | 1.78573E-06 | -1.19251E-06 | 5.24569E-07 | 1.42482E-06 | 1.30334E-09 |
| A6 | -1.89404E-09 | 2.01181E-09 | -5.40981E-09 | -1.27076E-08 | 9.54484E-09 | -1.56859E-08 | -3.36705E-11 |
| A7 | -4.46914E-10 | -4.45172E-10 | -2.53777E-09 | 9.33609E-10 | -4.37713E-12 | -2.56974E-10 | -4.06818E-13 |
| A8 | -2.02410E-11 | -2.38661E-11 | -2.83959E-11 | 3.30128E-11 | -3.53480E-12 | 1.35081E-13 | 3.11657E-15 |
| A9 | -4.86548E-13 | -4.40663E-13 | 4.37761E-12 | 8.10616E-13 | -8.40914E-14 | 8.44670E-14 | 1.27480E-16 |
| A10 | -4.31122E-15 | -3.84598E-14 | 2.36270E-13 | 2.30322E-14 | -1.31855E-15 | 1.64533E-15 | 2.95982E-19 |
| A11 | -5.47935E-16 | -3.42065E-15 | 1.96989E-15 | 1.13996E-15 | 1.24314E-18 | 3.62616E-18 | -3.05769E-20 |
| A12 | -1.27378E-16 | -3.05438E-16 | -6.75850E-16 | 6.02029E-17 | 9.69808E-20 | 3.32418E-19 | 1.66549E-22 |
| A13 | | | -3.56846E-19 | -2.46470E-19 | -2.21451E-20 | -8.84882E-22 | 5.59074E-26 |
| A14 | | | 1.19497E-19 | -3.54127E-20 | -4.03537E-22 | -2.37858E-22 | 5.06086E-28 |
| A15 | | | 8.74422E-21 | -2.08793E-21 | 1.00930E-24 | -1.13504E-23 | 3.12644E-30 |
| A16 | | | 7.22029E-22 | -9.92858E-23 | 5.84037E-25 | -3.13589E-25 | 2.24648E-33 |
| A17 | | | 4.51683E-23 | -3.55919E-24 | 3.26046E-26 | -7.34658E-27 | -2.58918E-34 |
| A18 | | | 2.00233E-25 | -9.29696E-26 | 1.15759E-27 | -7.12509E-29 | -4.11168E-36 |
| A19 | | | 2.04477E-26 | -1.89605E-28 | 1.50936E-29 | 2.57253E-30 | -3.05249E-38 |
| A20 | | | -3.48114E-27 | 2.41636E-28 | -1.78803E-30 | 2.50172E-31 | 1.23870E-40 |

FIGS. 10B, 10C illustrate distortion and spot diagrams of the projection optical system of Example 9 respectively.

As is clear from FIGS. 10A, 10B, 10C and Tables 9A, 9B, the projection optical system of Example 9 is a projection optical system capable of satisfactorily correcting various types of aberrations that occur at the time of focus adjustment.

The present invention is not limited to each of the examples described above, and various alternative examples are possible without departing from the spirit of the present invention. For example, values of radius of curvature of each lens, surface distance, refractive index, and the like are not limited to those shown in each table and may take other values.

What is claimed is:

1. A projection optical system for magnifying and projecting an image formed on a conjugate plane on the reduction side to a conjugate plane on the magnification side, the projection optical system substantially consisting of a first optical system composed of a plurality of lens groups and a second optical system composed of one reflection mirror having a convex aspherical surface arranged in this order from the reduction side, wherein:

all optical surfaces constituting the first and second optical systems are formed so as to have rotationally symmetrical shapes around one common axis;

the projection optical system is configured such that focus adjustment is performed by individually moving two lens groups in the first optical system along the common axis; and the lens disposed on the most magnification side in the reduction side lens group of the two lens groups is a lens having a convex surface on the magnification side.

2. The projection optical system of claim 1, wherein the lens disposed on the most magnification side in the magnification side lens group of the two lens groups is a lens having a concave surface on the magnification side.

3. The projection optical system of claim 1, wherein the lens disposed on the most magnification side in the magnification side lens group of the two lens groups is a lens having the convex surface on the magnification side.

4. The projection optical system of claim 1, wherein the reduction side lens group is composed of one positive single lens.

5. The projection optical system of claim 1, wherein the magnification side lens group has at least a cemented lens formed by cementing a negative lens and a positive lens.

6. The projection optical system of claim 1, wherein the projection optical system is configured such that the reduction side of the entire lens system has telecentricity.

7. The projection optical system of claim 2, wherein the reduction side lens group is composed of one positive single lens.

8. The projection optical system of claim 2, wherein the magnification side lens group has at least a cemented lens formed by cementing a negative lens and a positive lens.

9. The projection optical system of claim 2, wherein the projection optical system is configured such that the reduction side of the entire lens system has telecentricity.

10. The projection optical system of claim 3, wherein the reduction side lens group is composed of one positive single lens.

11. The projection optical system of claim 3, wherein the magnification side lens group has at least a cemented lens formed by cementing a negative lens and a positive lens.

12. The projection optical system of claim 3, wherein the projection optical system is configured such that the reduction side of the entire lens system has telecentricity.

13. The projection optical system of claim 4, wherein the magnification side lens group has at least a cemented lens formed by cementing a negative lens and a positive lens.

14. The projection optical system of claim 4, wherein the projection optical system is configured such that the reduction side of the entire lens system has telecentricity.

15. The projection optical system of claim 5, wherein the projection optical system is configured such that the reduction side of the entire lens system has telecentricity.

16. A projection display apparatus, comprising a light source, a light valve, an illumination optical unit for guiding a luminous flux from the light source to the light valve, and the projection optical system of claim 1, wherein the luminous flux from the light source is optically modulated by the light valve and projected onto a screen through the projection optical system.

* * * * *